United States Patent
Terry

(10) Patent No.: US 10,230,558 B2
(45) Date of Patent: Mar. 12, 2019

(54) SYSTEM AND METHOD FOR CONTROLLING COMBINED RADIO SIGNALS

(71) Applicant: PlusN, LLC, Elmsford, NY (US)

(72) Inventor: John David Terry, Annandale, VA (US)

(73) Assignee: PlusN, LLC, Elmsford, NY (US)

(*) Notice: Subject to any disclaimer, the term of this patent is extended or adjusted under 35 U.S.C. 154(b) by 0 days.

(21) Appl. No.: 15/625,641

(22) Filed: Jun. 16, 2017

(65) Prior Publication Data

US 2017/0295048 A1   Oct. 12, 2017

Related U.S. Application Data

(63) Continuation of application No. 15/217,704, filed on Jul. 22, 2016, now Pat. No. 9,686,112, which is a
(Continued)

(51) Int. Cl.
*H04L 5/00* (2006.01)
*H04L 27/26* (2006.01)
(Continued)

(52) U.S. Cl.
CPC .......... *H04L 27/2614* (2013.01); *H04L 5/001* (2013.01); *H04L 5/0007* (2013.01);
(Continued)

(58) Field of Classification Search
CPC . H04L 5/0048; H04L 5/0007; H04L 27/2601; H04L 27/2614; H04L 27/2634; H04L 27/2627
(Continued)

(56) References Cited

U.S. PATENT DOCUMENTS

| 5,302,914 A | 4/1994 | Arntz et al. |
| 5,557,612 A | 9/1996 | Bingham |

(Continued)

FOREIGN PATENT DOCUMENTS

| EP | 1838062 | 9/2007 |
| GB | 2428168 | 1/2007 |

(Continued)

OTHER PUBLICATIONS

U.S. Appl. No. 61/220,802, filed Jun. 26, 2009, Terry.
(Continued)

*Primary Examiner* — Emmanuel Bayard
(74) *Attorney, Agent, or Firm* — Tully Rinckey PLLC; Steven M. Hoffberg

(57) ABSTRACT

A method for controlling a combined waveform, representing a combination of at least two signals having orthogonal frequency multiplexed signal components, comprising: receiving information defining the at least two signals; transforming the information defining each signal to a representation having orthogonal frequency multiplexed signal components, such that at least one signal has at least two alternate representations of the same information, and combining the transformed information using the at least two alternate representations, in at least two different ways, to define respectively different combinations; analyzing the respectively different combinations with respect to at least one criterion; and outputting a respective combined waveform or information defining the waveform, representing a selected combination of the transformed information from each of the at least two signals selected based on the analysis.

20 Claims, 19 Drawing Sheets

Related U.S. Application Data continuation of application No. 14/954,326, filed on Nov. 30, 2015, now Pat. No. 9,565,045, which is a continuation of application No. 14/553,580, filed on Nov. 25, 2014, now Pat. No. 9,401,923, and a continuation of application No. 14/553,631, filed on Nov. 25, 2014, now Pat. No. 9,203,654.

(60) Provisional application No. 61/909,252, filed on Nov. 26, 2013.

(51) Int. Cl.
| | | |
|---|---|---|
| H04L 25/02 | (2006.01) | |
| H04L 27/36 | (2006.01) | |
| H04L 12/707 | (2013.01) | |
| H04J 11/00 | (2006.01) | |
| H04W 84/12 | (2009.01) | |

(52) U.S. Cl.
CPC ........ H04L 5/0048 (2013.01); H04L 25/0204 (2013.01); H04L 25/0242 (2013.01); H04L 27/2607 (2013.01); H04L 27/2618 (2013.01); H04L 27/2621 (2013.01); H04L 27/2624 (2013.01); H04L 27/2626 (2013.01); H04L 27/2649 (2013.01); H04L 27/2657 (2013.01); H04L 27/367 (2013.01); H04L 45/24 (2013.01); H04J 11/00 (2013.01); H04L 5/0053 (2013.01); H04L 25/022 (2013.01); H04L 25/0224 (2013.01); H04L 27/2655 (2013.01); H04W 84/12 (2013.01)

(58) Field of Classification Search
USPC ................................................. 375/260, 295
See application file for complete search history.

(56) References Cited

U.S. PATENT DOCUMENTS

| | | | |
|---|---|---|---|
| 6,104,708 A * | 8/2000 | Bergamo | H04B 7/1858 |
| | | | 370/320 |
| 6,882,217 B1 | 4/2005 | Mueller | |
| 6,925,128 B2 | 8/2005 | Corral | |
| 7,002,904 B2 | 2/2006 | Jung | |
| 7,072,411 B1 | 7/2006 | Dollard | |
| 7,292,639 B1 | 11/2007 | Demirekler et al. | |
| 7,301,891 B2 | 11/2007 | Park et al. | |
| 7,313,199 B2 | 12/2007 | Gupta et al. | |
| 7,315,580 B2 | 1/2008 | Feng et al. | |
| 7,321,629 B2 | 1/2008 | Feng et al. | |
| 7,339,884 B2 | 3/2008 | Bar-Ness et al. | |
| 7,340,006 B2 | 3/2008 | Yun et al. | |
| 7,342,978 B2 | 3/2008 | Feng et al. | |
| 7,345,990 B2 | 3/2008 | Son | |
| 7,349,817 B2 | 3/2008 | Cha | |
| 7,376,074 B2 | 5/2008 | Jung et al. | |
| 7,376,202 B2 | 5/2008 | Bar-Ness et al. | |
| 7,391,713 B2 | 6/2008 | Anvari | |
| 7,443,904 B2 | 10/2008 | Choi et al. | |
| 7,463,698 B2 | 12/2008 | Fujii et al. | |
| 7,467,338 B2 | 12/2008 | Saul | |
| 7,496,028 B2 | 2/2009 | Jung et al. | |
| 7,499,496 B2 | 3/2009 | Fujii et al. | |
| 7,535,950 B2 | 5/2009 | Chen et al. | |
| 7,646,700 B2 | 1/2010 | Wang et al. | |
| 7,953,174 B2 | 5/2011 | Asbeck et al. | |
| 7,961,591 B2 | 6/2011 | Abedi | |
| 8,009,764 B2 | 8/2011 | Kwon et al. | |
| 8,027,398 B2 | 9/2011 | Lin et al. | |
| 8,111,778 B2 | 2/2012 | Yano et al. | |
| 8,111,787 B2 | 2/2012 | Koorapaty et al. | |
| 8,130,867 B2 | 3/2012 | Budianu et al. | |
| 8,145,066 B2 | 3/2012 | Painchaud et al. | |
| 8,204,141 B2 | 6/2012 | Lee et al. | |
| 8,208,567 B2 | 6/2012 | Yeon et al. | |
| 8,520,494 B2 | 8/2013 | Yang et al. | |
| 8,582,687 B2 | 11/2013 | Terry | |
| 8,787,873 B1 | 7/2014 | Hitt et al. | |
| 9,160,593 B2 | 10/2015 | Terry | |
| 9,401,823 B2 | 7/2016 | Terry | |
| 2005/0073360 A1 | 4/2005 | Johnson et al. | |
| 2005/0089109 A1 | 4/2005 | Yun et al. | |
| 2005/0089116 A1 | 4/2005 | Moffatt et al. | |
| 2005/0100108 A1 | 5/2005 | Yun et al. | |
| 2005/0238110 A1 | 10/2005 | Yun et al. | |
| 2005/0243938 A1 | 11/2005 | Armstrong et al. | |
| 2005/0265468 A1 | 12/2005 | Fujii et al. | |
| 2005/0265479 A1 | 12/2005 | Fujii et al. | |
| 2005/0270968 A1 | 12/2005 | Feng et al. | |
| 2005/0286648 A1 | 12/2005 | Feng et al. | |
| 2006/0023666 A1* | 2/2006 | Jalali | H04L 5/023 |
| | | | 370/334 |
| 2006/0039498 A1 | 2/2006 | de Figueiredo et al. | |
| 2006/0078066 A1 | 4/2006 | Yun et al. | |
| 2006/0098747 A1 | 5/2006 | Yue et al. | |
| 2006/0115010 A1 | 6/2006 | Rog et al. | |
| 2006/0120268 A1 | 6/2006 | Bar-Ness et al. | |
| 2006/0120269 A1 | 6/2006 | Kim et al. | |
| 2006/0126748 A1 | 6/2006 | Lin et al. | |
| 2006/0215732 A1 | 9/2006 | Chen et al. | |
| 2006/0245346 A1 | 11/2006 | Bar-Ness et al. | |
| 2006/0247898 A1 | 11/2006 | Cha | |
| 2006/0268672 A1 | 11/2006 | Sari | |
| 2007/0019537 A1 | 1/2007 | Paulraj | |
| 2007/0076588 A1 | 4/2007 | Alapuranen | |
| 2007/0089015 A1 | 4/2007 | Saul | |
| 2007/0092017 A1 | 4/2007 | Abedi | |
| 2007/0098094 A1 | 5/2007 | Yue et al. | |
| 2007/0121483 A1 | 5/2007 | Zhang et al. | |
| 2007/0140367 A1 | 6/2007 | Braithwaite | |
| 2007/0189334 A1 | 8/2007 | Awad | |
| 2007/0189404 A1* | 8/2007 | Baum | H04L 25/0228 |
| | | | 375/260 |
| 2007/0217329 A1 | 9/2007 | Abedi | |
| 2007/0223365 A1 | 9/2007 | Tsfaty et al. | |
| 2007/0291860 A1 | 12/2007 | Wang et al. | |
| 2008/0008084 A1 | 1/2008 | Son | |
| 2008/0049602 A1 | 2/2008 | Jung et al. | |
| 2008/0095252 A1 | 4/2008 | Kim et al. | |
| 2008/0112496 A1 | 5/2008 | Devlin et al. | |
| 2008/0215655 A1 | 9/2008 | Negre et al. | |
| 2008/0232235 A1 | 9/2008 | Kowalski et al. | |
| 2008/0267312 A1 | 10/2008 | Yokoyama | |
| 2008/0285432 A1 | 11/2008 | Ueng et al. | |
| 2008/0285673 A1 | 11/2008 | Han et al. | |
| 2008/0298490 A1 | 12/2008 | Yun et al. | |
| 2008/0310383 A1 | 12/2008 | Kowalski | |
| 2009/0003308 A1 | 1/2009 | Baxley et al. | |
| 2009/0011722 A1 | 1/2009 | Kleider et al. | |
| 2009/0016464 A1 | 1/2009 | Zheng et al. | |
| 2009/0034407 A1 | 2/2009 | Lindh | |
| 2009/0046702 A1 | 2/2009 | Luo et al. | |
| 2009/0052561 A1 | 2/2009 | Baxley et al. | |
| 2009/0052577 A1 | 2/2009 | Wang | |
| 2009/0060070 A1 | 3/2009 | Hayase et al. | |
| 2009/0060073 A1 | 3/2009 | Yano et al. | |
| 2009/0067318 A1 | 3/2009 | Kowalski | |
| 2009/0074093 A1 | 3/2009 | Han et al. | |
| 2009/0080500 A1 | 3/2009 | Muharemovic et al. | |
| 2009/0086848 A1 | 4/2009 | Han et al. | |
| 2009/0097579 A1 | 4/2009 | Yeon et al. | |
| 2009/0110033 A1 | 4/2009 | Shattil | |
| 2009/0110034 A1 | 4/2009 | Kowalski | |
| 2009/0135949 A1 | 5/2009 | Yu | |
| 2009/0147870 A1 | 6/2009 | Lin et al. | |
| 2009/0168730 A1* | 7/2009 | Baum | H04L 5/0007 |
| | | | 370/336 |
| 2009/0238064 A1 | 9/2009 | Lee et al. | |
| 2009/0303868 A1 | 12/2009 | Kimura | |
| 2010/0002800 A1 | 1/2010 | Kim et al. | |
| 2010/0008432 A1 | 1/2010 | Kim et al. | |
| 2010/0098139 A1 | 4/2010 | Braithwaite | |
| 2010/0124294 A1 | 5/2010 | Birru et al. | |

(56) References Cited

U.S. PATENT DOCUMENTS

| | | | |
|---|---|---|---|
| 2010/0142475 | A1 | 6/2010 | Kim et al. |
| 2011/0135016 | A1 | 6/2011 | Ahn et al. |
| 2011/0261676 | A1 | 10/2011 | Zhou et al. |
| 2011/0280169 | A1 | 11/2011 | Seo et al. |
| 2012/0039252 | A1 | 2/2012 | Damnjanovic et al. |
| 2012/0093088 | A1 | 4/2012 | Yang et al. |
| 2012/0328045 | A1 | 12/2012 | Naguib et al. |
| 2013/0114761 | A1 | 5/2013 | Azadet et al. |
| 2013/0121432 | A1 | 5/2013 | Mondal et al. |
| 2013/0156125 | A1 | 6/2013 | Ko et al. |
| 2015/0295629 | A1* | 10/2015 | Xia .............. H04B 7/0491 370/329 |
| 2016/0036612 | A1 | 2/2016 | Telly |
| 2017/0346665 | A1* | 11/2017 | Hadani .............. H04B 1/1027 |

FOREIGN PATENT DOCUMENTS

| | | |
|---|---|---|
| WO | WO 2007/055518 | 5/2007 |
| WO | WO 2009/022856 | 2/2009 |
| WO | WO 2009/089753 | 7/2009 |
| WO | WO 2010/077118 | 7/2010 |
| WO | WO 2012/030319 | 3/2012 |
| WO | WO 2012/162655 | 11/2012 |
| WO | WO 2013/005214 | 1/2013 |
| WO | WO 2013/015606 | 1/2013 |
| WO | WO 2015/081107 | 6/2015 |

OTHER PUBLICATIONS

U.S. Appl. No. 61/221,190, filed Jun. 29, 2009, Terry.
U.S. Appl. No. 61/555,585, filed Nov. 4, 2011, Hitt et al.
U.S. Appl. No. 61/909,252, filed Nov. 26, 2013, Terry.
U.S. Appl. No. 14/335,061, filed Jul. 18, 2014, Hitt et al.
U.S. Appl. No. 15/217,704, filed Jul. 22, 2016, Terry.
PCT Search Report for Application No. PCT/US2014/067426 dated Feb. 27, 2015 (11 pages).
"Peak-to-average power ratio (PAPR)", Wireless Information Transmission System Lab., Mar. 2, 2006.
Abouda et al, PAPR Reduction of OFDM Signal Using Turbo Coding and Selective Mapping, Finland, Jun. 9-11, 2004.
Ahirwar et al, Tradeoff Between PAPR Reduction and Decoding Complexity in Transformed OFDM Systems, IEEE 2005.
Akhtman et al, Peak-to-Average Power Ratio Reduction for OFDM Modems, IEEE 2003.
Alavi et al, PAPR Reduction of OFDM Signals Using Partial Transmit Sequence: An Optimal Approach Using Sphere Decoding, IEEE Communications Letters, vol. 9, No. 11, Nov. 2005.
Alharbi, et al., "A combined SLM and closed-loop QO-STBC for PAPR mitigation in MIMO-OFDM transmission". www.eurasip.org/proceedings/Eusipco/Eusipco2008/papers/15691020632008.
Al-Kebsi, et al., "Throughput enhancement and performance improvement of the OFDM based WLAN system", IJCSNS International Journal of Computer Science and Network Security, vol. 9, No. 4, Apr. 2009.
Andgart, et al., "Designing Tone Reservation PAR reduction", EURASIP Journal on applied Signal Processing, vol. 2006, article ID 38237, pp. 1-14.
Armstrong, New OFDM Peak-to-Average Power Reduction Scheme, Australia, 2001.
Baxley, "Analyzing selected mapping for peak-to-average power reduction in OFDM", Thesis, School of Electrical and Computer Engineering, Georgia Institute of Technology, May 2005.
Baxley, et al., "Assessing peak-to-average power ratios for communications applications", Proc. IEEE Military Communications Conf (MILCOM 2004).
Baxley, et al., "Ordered phase sequence testing in SLM for improved blind detection", Proc. 2005 IEEE Conf on Signal Processing Advances in Wireless Communication.
Behravan et al, PAPR and Other Measures for OFDM Systems with Nonlinearity, Gothenburg, Sweden, 2002.
Behravan, et al., "Iterative estimation and cancellation of nonlinear distortion in OFDM systems", www.mantracom.com/downloads Jun. 19, 2008.
Boccardi, et al., "The p-sphere encoder: vector precoding with low peak-power for the MIMO Gaussian Broadcast Channel", IEEE Trans. Comm., vol. 54, p. 1703, Sep. 2006.
Bonaccorso, et al., "Reducing the peak to average power ratio in OFDM systems", Dix-septieme colloque GRETSI, Vannes, Sep. 13-17, 1999.
Boonsrimuang et al, PAPR Reduction Method for OFDM Signal by Using Dummy Sub-carriers, Proceedings of World Academy of Science, Engineering and Technology, vol. 12, Mar. 2006.
Boonsrimuang, et al., "Mitigation of non-linear distortion using PTS and IDAR method for multilevel QAM-OFDM system", ECTI Transactions on Computer and Information Technology, vol. 1, No. 2, Nov. 2005.
Breiling, et al., "Distortionless reduction of peak power without explicit side information", 2000 IEEE Global Telecommunications Conference.
Breiling, et al., "SLM peak-power reduction without explicit side information", IEEE Communications Letters, vol. 5, No. 6, Jun. 2001.
Chen et al, A Superimposed Periodic Pilot Scheme for Semi-Blind Channel Estimation of OFDM Systems, IEEE, 2002.
Chen et al, Combined Selective Mapping and Binary Cyclic Codes for PAPR Reduction in OFDM Systems, IEEE Transactions on Wireless Communications, vol. 6, No. 10, Oct. 2007.
Chen et al, Iterative Estimation and Cancellation of Clipping Noise for OFDM Signals, IEEE Communications Letters, vol. 7, No. 7, Jul. 2003.
Chen, et al., "A modified selective mapping with PAPR reduction and error correction in OFDM systems", 2007 IEEE Wireless Com. and Networking Conf., pp. 1329-1333.
Cho, et al, Selected Mapping Technique with Novel Phase Sequences for PAPR Reduction of an OFDM Signal, IEEE 2004.
Choi, et al., "Peak power reduction scheme based on subcarrier scrambling for MC-CDMA systems", IEE Proceedings on Communications, vol. 151, pp. 39-43, Feb. 2004.
Cimini, L. J, and N. R. Sollenberger, "Peak-to-Average Power Ratio Reduction of an OFDM Signal Using Partial Transmit Sequences", IEEE Commun. Lett., vol. 4, No. 3, pp. 86-88, Mar. 2000).
Ciochina, et al., An analysis of OFDM peak power reduction techniques for WiMAX systems, Proc. 2006 Int. Conf on Communications, pp. 4676-4681.
De Figueiredo, "Adaptive pre-distorters for linearization of high power amplifiers in OFDM wireless communications", IEEE North Jersey Section CASS/EDS Chapter, Distinguished lecture.
Debailllie et al, Energy-Scalable OFDM Transmitter Design and Control, San Francisco, CA Jul. 24-28, 2006.
Deng et al, Recursive Clipping and Filtering with Bounded Distortion for PAPR Reduction, IEEE Transactions on Communications, vol. 55, No. 1, Jan. 2007.
Deng, et al., "OFDM PAPR reduction using clipping with distortion control", Proc. 2005 IEEE Conf. on Communications.
Deumal, et al., "Peak reduction of multi-carrier systems by controlled spectral outgrowth", Proc. IEEE Intl. Conf. on Acoustics, Speech and Signal Processing (ICASSP), 2006.
Devlin, et al., "Gaussian pulse based tone reservation for reducing PAPR of OFDM signals", 2007 IEEE Vehicular Technol. Conf.
Dieter Van Welden et al, Clipping Versus Symbol Switching for PAPR Reduction in Coded OFDM, Belgium, 2008.
Fischer, "Peak-to-average power ratio (PAR) reduction in OFDM based on lattice decoding", Proc. Int. OFDM Workshop.
Fischer, "Widely-linear selected mapping for peak-to-average power ratio reduction in OFDM", Electronics Letters, vol. 43, 2007.
Fischer, et al., "Directed selected mapping for peak-to-average power ratio reduction in MIMO OFDM", Proc. International OFDM Workshop, 2007.
Fischer, et al., "Peak-to-average power ratio reduction in MIMO OFDM", Proc. 2007 Int. Conf on Communications, pp. 762-767.
Fischer, et al., "Peak-to-average power ratio reduction in single- and multi-antenna OFDM via directed selected mapping", Jul. 19, 2007.

(56) References Cited

OTHER PUBLICATIONS

Fischer, et al., "Signal shaping for peak-power and dynamics reduction in transmission schemes employing precoding", IEEE Trans. on Comm., v50, pp. 735-741, May 2002.
Giannopoulos, et al., "Novel efficient weighting factors for PTS-based PAPR reduction in low-power OFDM transmitters",www.eurasip.org/proceedings/Eusipco/Eusipco2006/papers/1568-982220 2006.
Giannopoulos, et al., "Relationship among BER, power consumption and PAPR", 2008 IEEE Int. Symp on Wireless Pervasive Computing, pp. 633-637.
Goebel et al, On the Effect of FWM in Coherent Optical OFDM Systems, Munich, Germany, 2008.
Gregorio, Analysis and Compensation of Nonlinear Power Amplifier Effects in Multi-Antenna OFDM Systems, Helsinki, Finland 2007.
Guel et al, Clipping formulated as an adding signal technique for OFDM Peak Power Reduction, France, Sep. 2009.
Guel, et al., "Approximation of the average power variation for geometric adding signal approach of PAPR reduction in context of OFDM signals", Union Radio Scientifique Internationale-URSI, Aug. 7-16, 2008, Chicago, IL.
Habendorf, et al., "Nonlinear predistortion with reduced peak-to-average power ratio", Proc. International Symposium on Wireless Communications.
Haider, "Peak to average ratio reduction in wireless OFDM communication systems", Thesis, Blekinge Institute of Technology, Jan. 2006.
Han et al, An Overview of Peak-to-Average Power Ratio Reduction Techniques for Multicarrier Transmission, IEEE Wire Communications, Apr. 2005.
Han et al, Peak-to-Average Power Ratio Reduction of an OFDM Signal by Signal Set Expansion, Korea, 2004.
Handali et al, On Channel Capacity of OFDM with SLM Method for PAPR Reduction, Israel, 2006.
Henkel, et al., "Partial transmit sequences and trellis shaping", Proc. 5th Int. ITC Conf. on Source and Channel Coding, 2004.
Henkel, et al., Another application for trellis shaping: PAR reduction for DMT (OFDM), IEEE Transactions on Communications, vol. 48, No. 9, Sep. 2000.
Herraiz, "Multicaffier communication systems with low sensitivity to nonlinear amplification", Theses, Enginyeria i Arquitectura La Salle, Universitat Ramon Llull, Barcelona 2008.
Hill, G. R., Faulkner, and J. Singh, "Reducing the Peak-to-Average Power Ratio in OFDM by Cyclically Shifting Partial Transmit Sequences", Electronics Letters, vol. 36, No. 6, Mar. 16, 2000).
Hill, G., and M. Faulkner, "Cyclic Shifting and Time Inversion of Partial Transmit Sequences to Reduce the Peak-to-Average Ratio in OFDM", PIMRC 2000, vol. 2, pp. 1256-1259, Sep. 2000).
Ho et al, Iterative Detection for Pretransformed OFDM by Subcarrier Reconstruction, IEEE Transactions on Signal Processing, vol. 53, No. 8, Aug. 2005.
Hosseini, et al., "PAPR reduction in OFDM systems using polynomial based compressing and iterative expanding", 2006 IEEE ICASSP.
Hussain, et al., "Peak to average power ratio reduction for multiband OFDM system using tone reservation", www.ursi-test.intec.ugent.be/files/URSIGA08/papers/CPS2p5 2008.
Hussain, Sajjad, and Yves Louet. "Tone Reservation's complexity reduction using fast calculation of maximal IDFT element." Wireless Communications and Mobile Computing Conference, 2008. IWCMC'08. International. IEEE, 2008.
Hussein, et al., "Performance enhancement of STCB OFDM-CDMA system using channel coding techniques over multipath fading channel", Journal of Theoretical and Applied Information Technology, vol. 5, No. 5, pp. 591-601, Jun. 2009.
Jafari, " Adaptive lattice reduction in MIMO systems", Thesis, University of Waterloo, Canada, 2008.
Jayalath et al, Adaptive PTS Approach for Reduction of Peak-to-Average Power Ratio of OFDM Signal, Electronics Letters, vol. 36, No. 14, Jul. 6, 2000.
Jayalath, et al., "On the PAR reduction of OFDM signals using multiple signal representation", IEEE Communications Letters, vol. 8, No. 7, Jul. 2004.
Jayalath, et al., "SLM and PTS peak-power reduction of OFDM signals without side information", IEEE Transactions on Wireless Communications, vol. 4, No. 5, Sep. 2005.
Jayalath, et al., "Use of data permutation to reduce the peak-to-average power ratio of an OFDM signal", Wireless Communications and Mobile Computing, 2002, 2:187-203.
Jiang et al, An Overview: Peak-to-Average Power Ratio Reduction Techniques for OFDM Signals, IEEE, 2008.
Jiang, et al., "Two novel nonlinear companding schemes with iterative receiver to reduce PAPR in multi-carrier modulation systems", IEEE Transaction on Broadcasting, vol. 52, pp. 268-273, Jun. 2006.
Jimenez et al., "Study and Implementation of complementary Golay sequences for PAR reduction in OFDM signals", Proc. 11th Med. Electrotech. Conf. MELECON 2002, pp. 198-203.
Kasiri, et al., "A preprocessing method for PAPR reduction in OFDM systems by modifying FFT and IFFT matrices", The 18th Annual IEEE International Symposium on Personal, Indoor and Mobile Radio Communications (PIMRC'07).
Kaur, Inderjeet, et al., "The Minimum PAPR Code for OFDM Systems", World Academy of Science, Engineering and Technology 46 2008 p. 285.
Kou et al, A New Peak-to-Average Power-Ratio Reduction Algorithm for OFDM Systems Via Constellation Extension, IEEE 2007.
Lam, Chan-Tong, David D. Falconer, and Florence Danilo-Lemoine. "PAPR reduction using frequency domain multiplexed pilot sequences." Wireless Communications and Networking Conference, 2007. WCNC 2007. IEEE. IEEE, 2007.
Lawrey et al, Peak to Average Power Ratio Reduction of OFDM Signals Using Peak Reduction Carriers, Australia 1999.
Lee et al, Peak Power Reduction Using a Unitary Rotation in Multiple Transmit Antennas, IEEE, 2005.
Lee et al., "Novel low-complexity SLM schemes for PAPR reduction in OFDM systems", Proc. 2008 IEEE Global Telecommunications Conf GLOBECOM 2008.
Lee, et al., "Unitary peak power reduction for short packet communications in multiple transmit antennas", IEEE Trans. Commun., vol. 56, Feb. 2008, pp. 234-244.
Li, X., and L. J. Cimini, "Effects of Clipping and Filtering on the Performance of OFDM", IEEE Commun. Lett., vol. 2, No. 5, pp. 131-133, May 1998).
Lim et al, A New PTS OFDM Scheme with Low Complexity for PAPR Reduction, IEEE Transactions on Broadcasting, vol. 52, No. 1, Mar. 2006.
Lim, et al, Design of the Phase Sequences for Selected Mapping OFDM System, Seoul, 2004.
Lin et al, Turbo Coded OFDM System with Peak Power Reduction, IEEE, 2003.
Lin, "Performance analysis in the PAPR of OFDM system via SLM scheme", Master Thesis, Institute of Communication Engineering, Tatung University, Jan. 2004.
Lin, et al., "Selective-mapping type peak power reduction techniques for turbo coded OFDM", 2005 IEEE International Conference on Wireless Networks, Communications and Mobile Computing.
Litwin et al., "The Principles of OFDM" Jan. 2001, pp. 30-48.
Loyka, et al., "On the peak factor of sampled and continuous signals", Proc. 2006 IEEE Vehicular Technology Conf.
Lu et al, Enhanced Interleaved Partitioning PTS for Peak-to-Average Power Ratio Reduction in OFDM Systems, Electronic Letters, vol. 42, No. 17, Aug. 17, 2006.
Lu et al, Peak-to-Average Power Ratio Reduction in OFDM Based on Transformation of Partial Transmit Sequences, Electronics Letters, vol. 42, No. 2, Jan. 19, 2006.
Mackay, David J. C., Relationships Between Sparse Graph Codes, United Kingdom, 2000.

(56) References Cited

OTHER PUBLICATIONS

Malkin, et al., "Dynamic allocation of reserved tones for PAR reduction", OFDM Workshop, Aug. 2008, Hamburg Germany.

Malkin, et al., "Optimal constellation distortion for PAR reduction in OFDM systems", Proc. 2008 PIMRC.

Marsalek, "On the reduced complexity interleaving method for OFDM PAPR reduction", Radioengineering, vol. 1, No. 3, Sep. 2006.

Matejka, "DRM PAPR distribution and its relation to classical AM power amplifier", www.urel.feec.vutbr.cz/ra2008/archive/ra2003/papers/169.pdf, Radioelektronika 2003.

Mendes et al, On the Performance of WH-STC-OFDM and WH-SFC-OFDM in Non-Linear Time Variant Channels, Brazil, 2009.

Mobasher et al, Integer-Based Constellation Shaping Method for PAPR Reduction in OFDM Systems, Ontario, Canada, Jun. 14, 2005.

Mobasher et al, PAPR Reduction Using Integer Structures, Ontario, Canada, Apr. 30, 2004.

Mobasher, et al., "Integer-based constellation shaping method for PAPR reduction in OFDM systems", IEEE Transactions on Communications, vol. 54, pp. 119-127, Jan. 2006.

Muller, et al., "OFDM with reduced peak-to-average power ratio by multiple signal representation", Annals of Telecommunications, vol. 52, No. 1-2, pp. 58-67, Feb. 1997.

Muller, S. H., and J. B. Huber, "A Novel Peak Power Reduction Scheme for OFDM", Proc. of PIMRC '97, pp. 1090-1094, 1997.

Nawaz, et al., "PAPR reduction technique for OFDM systems with rotated MPSK constellations and coordinate interleaving", Proc. 2008 IEEE Symp on Comm. & Veh. Technol.

Nguyen et al, On Partial Transmit Sequences for PAR Reduction in OFDM Systems, British Columbia, Canada, 2008.

Nikookar et al, Random Phase Updating Algorithm for OFDM Transmission with Low PAPR, IEEE Transactions on Broadcasting, vol. 48, No. 2, Jun. 2002.

Nikookar et al, Weighted OFDM for Wireless Multipath Channels, IEICE Trans, Commun., vol. E83-B, No. 8, Aug. 2000.

Ouyang et al, A New Symbol Time Estimator for Orthogonal Frequency Division Multiplexing Systems, IEEE 2003.

Park, et al., "Tone reservation method for PAPR reduction scheme", IEEE 802.16e-03/60.

Pise, et al., "Packet forwarding with multiprotocol label switching" World Academy of Science,Engineering and Technology 12 2005.

Pradabpet, et al., "A new PAPR reduction in OFDM systems using PTS combined with APPR for TWTA nonlinear HPA", Songklanakarin J. Sci. Technol. 30 (3), 355-360, May-Jun. 2008.

Pradabpet, et al., "A new PTS method using GA for PAPR reduction in OFDM-WLAN 802.11a systems", www.jcsse.org/slide/comp.sub.--int/P0014.pdf.

Pratt et al, OFDM Link Performance with Companding for PAPR Reduction in the Presence of Non-Linear Amplification, Atlanta, Georgia, 2006.

Ragusa, et al., "Invertible clipping for increasing the power efficiency of OFDM amplification", Proc. 2007 IEEE Int. Symposium on Personal Indoor and Mobile Radio Communications.

Rajbanshi, "OFDM-based cognitive radio for DSA networks", Technical Report, The University of Kansas (2007).

Rajbanshi, et al., "Adaptive-mode peak-to-average power ratio reduction algorithm for OFDM-based cognitive radio", 2006 IEEE Vehicular Technology Conf.

Rajbanshi, et al., "OFDM symbol design for peak-to-average power ratio reduction employing non-data bearing subcarriers", Proc. 2008 IEEE Wireless Communications and Networking Conference, pp. 554-558.

Rajbanshi, et al., "Peak-to-average power ratio analysis for NC-OFDM transmissions", Proc. 2007 IEEE Vehicular Technology Conference.

Ren, "An improved selected mapping scheme for PAPR reduction in OFDM systems", Thesis, University of Cincinnati.

Ryu, Heung-Gyoon, Yingshan Li, and Jin-Soo Park. "An improved ICI reduction method in OFDM communication system." Broadcasting, IEEE Transactions on 51.3 (2005): 395-400.

Saito, et al., "PAPR reduction of MC-CDMA signals by selected mapping with interleavers", Multi-Carrier Spread-Spectrum, Springer Netherlands, pp. 453-460.

Sakran et al, An Efficient Technique for Reducing PAPR of OFDM System n the Presence of Nonlinear High Power Amplifier, Progress in Electromagnetics Research C, vol. 2, 233-241, 2008.

Sakran et al, Combined Interleaving and Companding for PAPR Reduction in OFDM Systems, Progress in Electromagnetics Research C, vol. 6, 67-78, 2009.

Sandberg et al, Receiver-oriented Clipping-effect Mitigation in OPDM—A Worthy Approach?, Sweden, 2005.

Sari, "OFDM peak power reduction techniques performance analysis for WiMAX Systems" Sequans Communications, 4th Annual Wireless Broadband Forum (2005).

Sathananthan, et al., "Reducing intercarrier interference in OFDM systems by partial transmit sequence and selected mapping", Proc. Int'l. Symp. on DSP for Comm. Systems, 2002.

Schenk, et al., "Peak-to-average power reduction in space division multiplexing based OFDM systems through spatial shifting", Electronics Letters, Jul. 21, 2005, vol. 41, No. 15.

Schenk, et al., "The application of spatial shifting for peak-to-average power ratio reduction in MIMO OFDM systems", Proc. 2006 IEEE Vehicular Technol. Conf.

Schurgers, et al., "A systematic approach to peak-to-average power ratio in OFDM", Proc. SPIE vol. 4474, p. 454 (2001).

Seng-Sik Eom et al., "Low-Complexity PAPR Reduction Scheme Without Side Information for OFDM Systems", IEEE Transactions on Signal Processing, vol. 60, Issue 7, pp. 3657-3669, Mar. 23, 2012.

Sezginer et al, Peak Power Reduction in OFDM Systems Using Dynamic Constellation Shaping, France, 2005.

Sezginer, et al., "Metric-based symbol predistortion techniques for peak power reduction in OFDM systems", IEEE Transactions on Wireless Communications, vol. 6, No. 7, Jul. 2007.

Sharif, et al., "On the peak-to-average power of OFDM signals based on oversampling", IEEE Transactions on Communications, vol. 51, No. 1, Jan. 2003.

Siegl, et al., "Partial transmit sequences for Peak-to-average power ratio reduction in multiantenna OFDM", Eurasip Journal on Wireless Communications and Networking, vol. 2008, article ID 325829, 11 pages.

Siegl, et al., "Peak-to-average power ratio reduction in multi-user OFDM", Proc. 2007 IEEE Int. Symp. on Information Theory, Stockholm, Sweden, Mar. 2007.

Slimane, Peak-to-Average Power Ratio Reduction of OFDM Signals Using Pulse Shaping, Stockholm, Sweden, Mar. 2007.

Sohn, RBF neural network based SLM peak-to-average power ratio reduction in OFDM systems, ETRI Journal, vol. 29, No. 3, Jun. 2007.

Taha, Performance analysis of ICC technique for OFDM PAPR reduction and its application over BTC, Master's degree project, Stockholm, Sweden 2006.

Tellambura, Improved Phase Factor Computation for the PAR Reduction of an OFDM Signal Using PTS, IEEE Communications Letters, vol. 5, No. 4, Apr. 2001.

Tellambura, Upper Bound on Peak Factor of N-multiple Carriers, Electronics Letters, vol. 33, No. 19, Sep. 11, 1997.

Thomas, PAPR Reduction Via a Fixed Frequency-Domain Weighting Across Multiple OFDM Bauds, Schaumburg, IL 2004.

Thompson et al, Constant Envelope OFDM Phase Modulation: Spectral Containment, Signal Space Properties and Performance, San Diego, CA 2008.

Thompson et al, Constant Envelope OFDM, IEEE Transactions on Communications, vol. 56, No. 8, Aug. 2008.

Thompson et al, The Effectiveness of Signal Clipping for PAPR and Total Degradation Reduction in OFDM Systems, IEEE Globecom, 2005.

Thompson, Steve C., Constant Envelope OFDM Phase Modulation, (Doctoral dissertation, University of California, San Diego) 2005.

(56) References Cited

OTHER PUBLICATIONS

Ting-Jung Liang et al., "Synchronization in OFDM-based WLAN with Transmit and Receive Diversities", in IEEE 16th Intl. Symp. on Personal, Indoor and Mobile Radio Comm., PIMRC 2005., vol. 2, Sep. 11-14, 2005, pp. 740-744.
Tsai, et al., "A tail-biting turbo coded OFDM system for PAPR and BER reduction", 2007 IEEE Vehicular Technology Conference.
Tseng, et al., "A reduced-complexity PTS scheme for peak-to-average power ratio reduction in OFDM systems", Proc. European Society for Signal Processing (EURASSIP) 2008.
Valbonesi, et al., "Low-complexity method for PAPR reduction in OFDM based on frame expansion parameter selection", 13.sup.th European Signal Processing Conference, Sep. 4-8, 2005, Antalya, Turkey.
Van Welden, et al., "Clipping versus symbol switching for PAPR reduction in coded OFDM", 15.sup.th Annual Symposium of the IEEE/CVT Benelux Chapter, Nov. 13, 2008.
Veeragandham, "Orthogonal frequency division multiplexing" EECS 865:Wireless Communications.
Vijayarangan, et al., "An overview of techniques for reducing peak to average power ratio and its selection criteria for orthogonal frequency division multiplexing radio systems", Journal of Theoretical and Applied Information Technology, vol. 5, No. 5 (Feb. 2009).
Wang et al, A Low-Complexity Companding Transform for Peak-to-Average Power Ratio Reduction in OFDM Systems, Republic of China, 2006.
Wang et al, A Simplified Clipping and Filtering Technique for PAR Reduction in OFDM Systems, IEEE Signal Processing Letters, vol. 12, No. 6, Jun. 2005.
Wang et al, OFDM or Single-Carrier Block Transmissions?, IEEE Transactions on Communications, vol. 52, No. 3, Mar. 2004.
Wang, "Peak to average power ratio reduction for OFDM", Research & Standards LGE Mobile Research, USA, Aug. 27, 2007, 3GPP2, TSG-C NTAH.
Wang, "Reduction of the PAPR in OFDM signals by applying PTS mechanism", Master Thesis, Institute of Communication Engineering, Tatung University, Jan. 2004.
Wei, et al., "A modern extreme value theory approach to calculating the distribution of the peak-to-average power ratio in OFDM systems", 2002 IEEE Int. Conf. on Communications, vol. 3, pp. 1686-1690.
Weiss et al, Mutual Interference in OFDM-Based Spectrum Pooling Systems, IEEE, 2004.
Wen, et al., "A sub-optimal PTS algorithm based on particle swarm optimization technique for PAPR reduction in OFDM systems", EURASIP J. Wireless Commun. and Networking (Jan. 2008).
Wen, et al., "The PAPR reduction in OFDM system with the help of signal mapping scheme", International Journal of Applied Science and Engineering 2007, 5, 1: 75-80.
Wesolowski, "On the PAPR minimization using selected mapping algorithm in pilot-assisted OFDM systems", Proc. European Wireless Conference, 2007.
Wu, et al., "8B/10B Codec for efficient PAPR reduction in OFDM communication systems", IEEE Int'l Conf on Wireless Communications, Networking and Mobile Computing (WCNMC), Jun. 13-16, 2005, Maui, HI, USA.
Wu, et al., "Peak-to-average power ration reduction in OFDM based on transformation of partial transmit sequences", Electronics Letters, Jan. 19, 2006, vol. 42, No. 2.
Wulich, et al., "Is PAPR reduction always justified for OFDM?", Proc. European Wireless Conference, 2007.
Xia Lei, Youxi Tang, Shaoqian Li, "A Minimum Clipping Power Loss Scheme for Mitigating the Clipping Noise in OFDM", GLOBECOM 2003, IEEE, vol. 1, pp. 69, Dec. 2003).
Yang, et al., "Selective vector perturbation precoding and peak to average power ratio reduction of OFDM systems", Proc. IEEE Global Telecommunications Conf., 2008.
Yicai et al, "An Effective Low-Complexity Method for PAPR Reduction in OFDM-based Systems", Mar. 31, 2009-Apr. 2, 2009, IEEE, pp. 176-180.
Yoo et al, A Novel PAPR Reduction Scheme for OFDM Systems: Selective Mapping of Partial Tones (SMOPT), IEEE Transactions on Consumer Electronics, vol. 52, No. 1, Feb. 2006.
Yoo et al, Amplitude PDF Analysis of OFDM Signal Using Probabilistic PAPR Reduction Method, EURASIP Journal on Wireless Communications and Networking, vol. 2011, Article 1D 983915, Jan. 19, 2011.
Zhao, "Distortion-based crest factor reduction algorithms in multicarrier transmission systems", A Dissertation, Georgia Institute of Technology, Dec. 2007.
Zhao, et al., "A study on the PAPR reduction by hybrid algorithm based on the PTS and GS technique", The Journal of the Korean Institute of Communication Sciences, vol. 31, No. 2A, p. 187, Feb. 2006.
Janaaththanan, Sundarampillai. OFDM based air interfaces for future mobile satellite systems. Diss. University of Surrey (United Kingdom), 2008.
Supplemental European Search Report dated May 23, 2017 for European Patent Application No. 10853381.

* cited by examiner

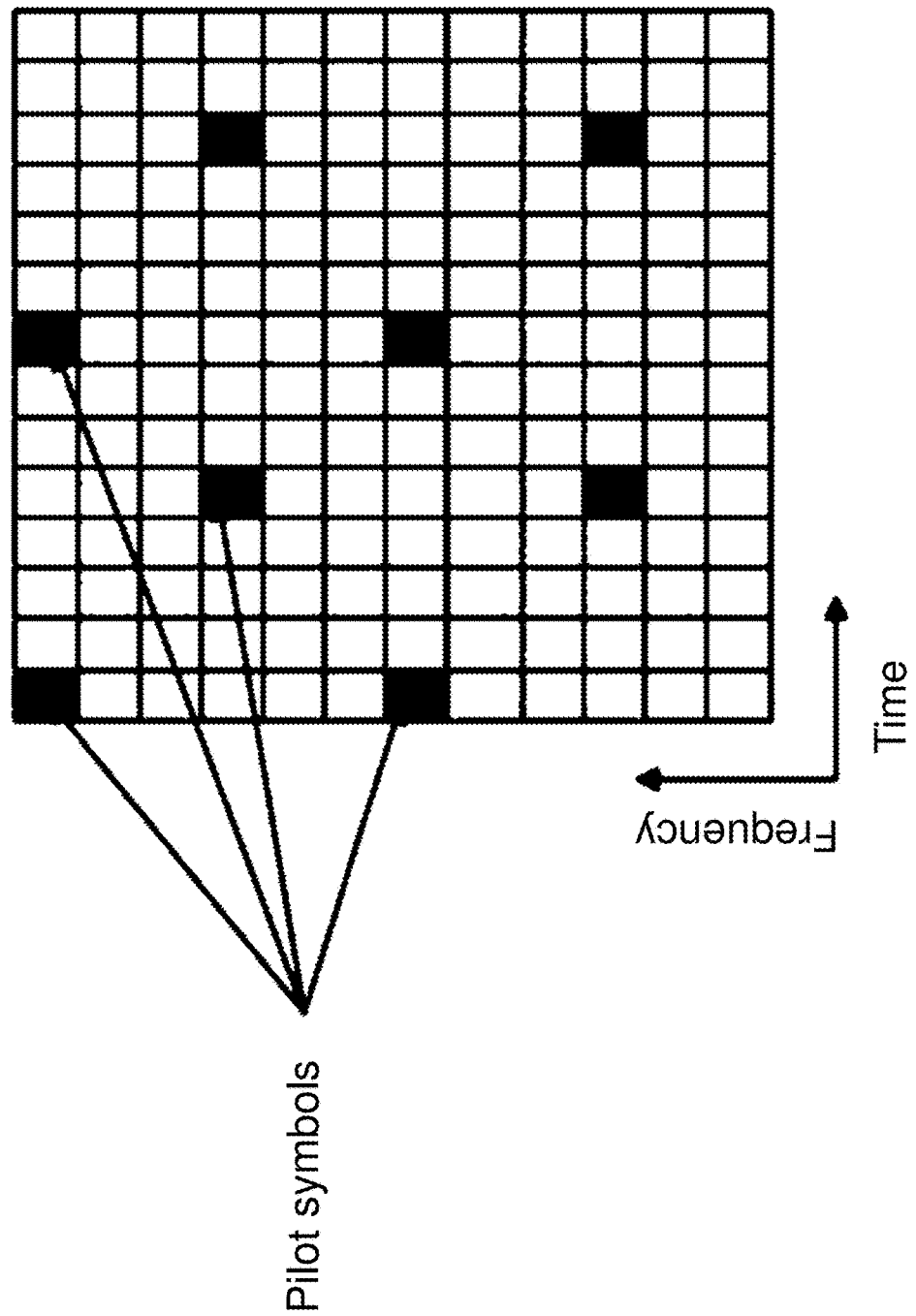

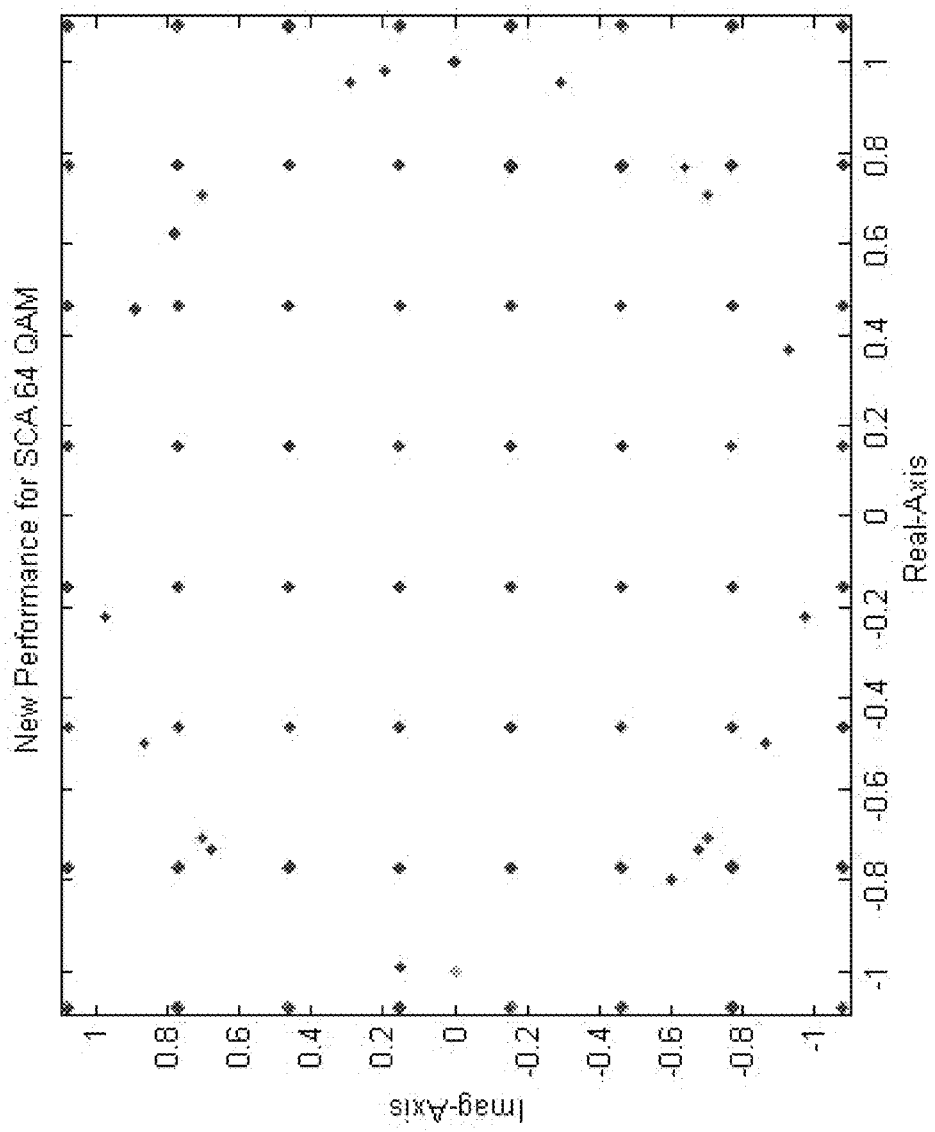
Fig. 12A Performance without Noise

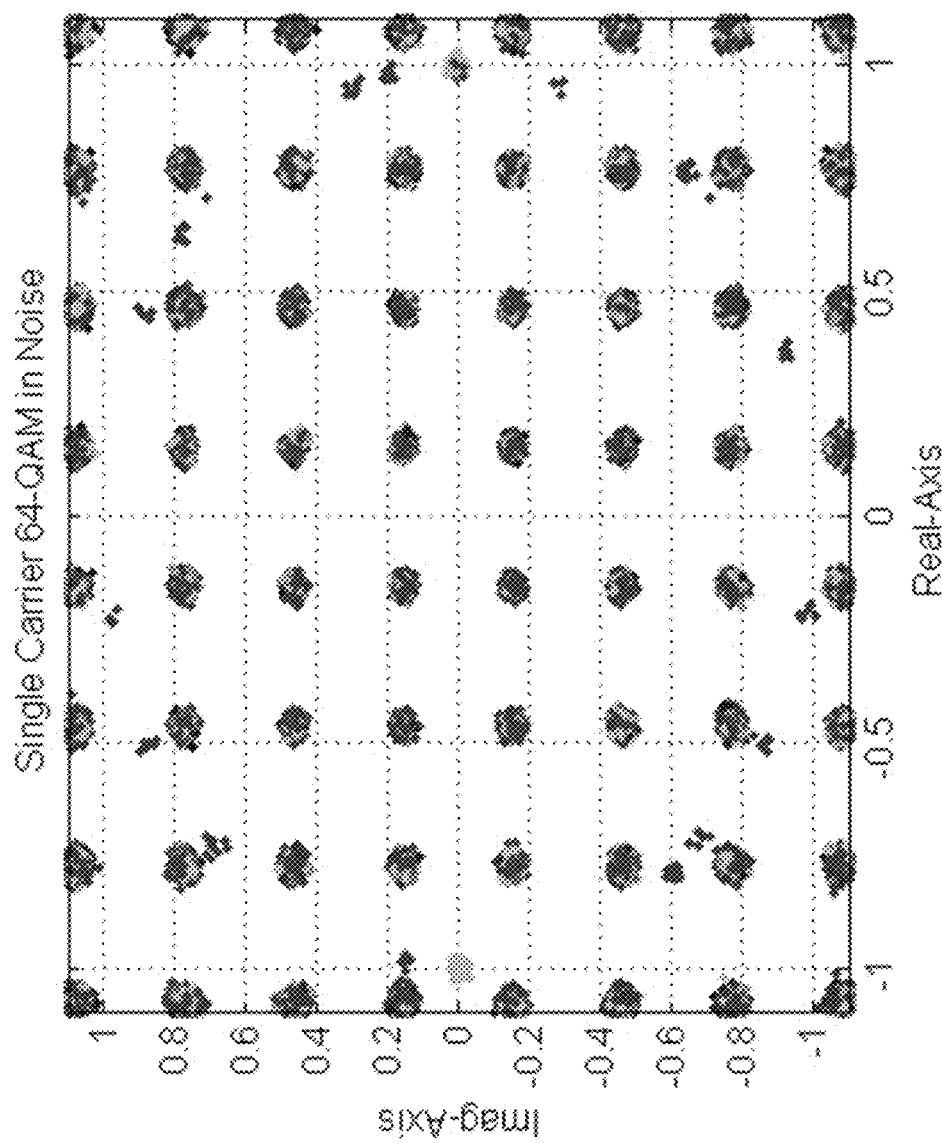
Fig. 12B Performance with Noise

SYSTEM AND METHOD FOR CONTROLLING COMBINED RADIO SIGNALS

CROSS REFERENCE TO RELATED APPLICATIONS

This application is a Continuation of U.S. patent application Ser. No. 15/217,704, filed Jul. 22, 2016, now U.S. Pat. No. 9,686,112, issued Jun. 20, 2017, which is a Continuation of U.S. patent application Ser. No. 14/553,580, filed Nov. 25, 2014, now U.S. Pat. No. 9,401,923, issued Jul. 26, 2016, and is a Continuation of U.S. U.S. patent application Ser. No. 14/954,326, filed Nov. 30, 2015, which is a Continuation of U.S. U.S. patent application Ser. No. 14/553,631, filed Nov. 25, 2014, now U.S. Pat. No. 9,203,654, issued Dec. 1, 2015, each of which claims benefit of priority under 35 U.S.C. § 119(e) to U.S. Provisional Patent Application No. 61/909,252, filed Nov. 26, 2013, the entirety of which are expressly incorporated herein by reference.

This application is related to PCT/US14/67426, WO 2015/081107.

FIELD OF THE INVENTION

This invention relates to the field of wireless communications of radio-frequency signals. More specifically, it relates to controlling a combined signal, for example to reduce its peak to average power ratio or an inferred error at a receiver.

BACKGROUND OF THE INVENTION

A common signal format for mobile wireless communications is orthogonal frequency-domain multiplexing (OFDM) (see, for example, en.wikipedia.org/Orthogonal_frequency-division_multiplexing), and closely related formats such as orthogonal frequency-domain multiple access (OFDMA). For a signal conveyed on an OFDM channel, this is characterized in the frequency domain by a bundle of narrow adjacent subchannels, and in the time domain by a relatively slow series of OFDM symbols each with a time T, each separated by a guard interval $\Delta T$ (see FIG. 1B). Within the guard interval before each symbol is a cyclic prefix (CP), comprised of the same signal in the symbol period, cyclically shifted in time. This CP is designed to reduce the sensitivity of the received signal to precise time synchronization in the presence of multipath, i.e., radio-frequency signals reflecting from large objects in the terrain such as tall buildings, hills, etc. If a given symbol is received with a slight time delay (less than $\Delta T$), it will still be received without error. In addition to the data symbols associated with the OFDM "payload", there is also typically a "preamble" signal that establishes timing and other standards. The preamble may have its own CP, not shown in FIG. 1B.

In addition to the preamble, a set of pilot symbols (also called training symbols) are typically interleaved (in time and frequency) among the data symbols in the payload. These pilot symbols are used together with the preamble for further refinement of timing, channel estimation, and signal equalization at the receiver. The particular placement of pilot symbols in time and frequency within the payload may differ among various OFDM standard protocols. A typical example of the placement of pilot symbols in the time-frequency resource grid is shown in FIG. 2 for a protocol known as "Long-Term Evolution" (LTE). (See, for example, www.mathworks.com/help/lte/ug/channel-estimation.html for further information.) Here pilot symbols are located at four different frequencies, with a pattern that repeats every eight symbol periods. This enables the receiver to obtain information on time-varying channel estimation across the entire resource grid, using interpolation of the various pilot symbols.

In OFDM, the sub-carrier frequencies are chosen so that the sub-carriers are orthogonal to each other, meaning that cross-talk between the sub-channels is eliminated and inter-sub-carrier guard bands are not required. This greatly simplifies the design of both the transmitter and the receiver; unlike conventional FDM, a separate filter for each sub-channel is not required. The orthogonality requires that the sub-carrier spacing is $\Delta f = k/(T_U)$ Hertz, where $T_U$ seconds is the useful symbol duration (the receiver side window size), and k is a positive integer, typically equal to 1. Therefore, with N sub-carriers, the total passband bandwidth will be $B \approx N \cdot \Delta f$ (Hz). The orthogonality also allows high spectral efficiency, with a total symbol rate near the Nyquist rate. Almost the whole available frequency band can be utilized. OFDM generally has a nearly "white" spectrum, giving it benign electromagnetic interference properties with respect to other co-channel users.

When two OFDM signals are combined, the result is in general a non-orthogonal signal. While a receiver limited to the band of a single OFDM signal would be generally unaffected by the out-of-channel signals, when such signals pass through a common power amplifier, there is an interaction, due to the inherent non-linearities of the analog system components.

OFDM requires very accurate frequency synchronization between the receiver and the transmitter; with frequency deviation the sub-carriers will no longer be orthogonal, causing intercarrier interference (ICI), i.e. cross-talk between the sub-carriers. Frequency offsets are typically caused by mismatched transmitter and receiver oscillators, or by Doppler shift due to movement. While Doppler shift alone may be compensated for by the receiver, the situation is worsened when combined with multipath, as reflections will appear at various frequency offsets, which is much harder to correct.

The orthogonality allows for efficient modulator and demodulator implementation using the fast Fourier transform (FFT) algorithm on the receiver side, and inverse FFT (IFFT) on the sender side. While the FFT algorithm is relatively efficient, it has modest computational complexity which may be a limiting factor.

One key principle of OFDM is that since low symbol rate modulation schemes (i.e. where the symbols are relatively long compared to the channel time characteristics) suffer less from intersymbol interference caused by multipath propagation, it is advantageous to transmit a number of low-rate streams in parallel instead of a single high-rate stream. Since the duration of each symbol is long, it is feasible to insert a guard interval between the OFDM symbols, thus eliminating the intersymbol interference. The guard interval also eliminates the need for a pulse-shaping filter, and it reduces the sensitivity to time synchronization problems.

The cyclic prefix, which is transmitted during the guard interval, consists of the end of the OFDM symbol copied into the guard interval, and the guard interval is transmitted followed by the OFDM symbol. The reason that the guard interval consists of a copy of the end of the OFDM symbol is so that the receiver will integrate over an integer number of sinusoid cycles for each of the multipaths when it performs OFDM demodulation with the FFT.

The effects of frequency-selective channel conditions, for example fading caused by multipath propagation, can be considered as constant (flat) over an OFDM sub-channel if the sub-channel is sufficiently narrow-banded, i.e. if the number of sub-channels is sufficiently large. This makes equalization far simpler at the receiver in OFDM in comparison to conventional single-carrier modulation. The equalizer only has to multiply each detected sub-carrier (each Fourier coefficient) by a constant complex number, or a rarely changed value. Therefore, receivers are generally tolerant of such modifications of the signal, without requiring that explicit information be transmitted.

OFDM is invariably used in conjunction with channel coding (forward error correction), and almost always uses frequency and/or time interleaving. Frequency (subcarrier) interleaving increases resistance to frequency-selective channel conditions such as fading. For example, when a part of the channel bandwidth is faded, frequency interleaving ensures that the bit errors that would result from those subcarriers in the faded part of the bandwidth are spread out in the bit-stream rather than being concentrated. Similarly, time interleaving ensures that bits that are originally close together in the bit-stream are transmitted far apart in time, thus mitigating against severe fading as would happen when travelling at high speed. Therefore, similarly to equalization per se, a receiver is typically tolerant to some degree of modifications of this type, without increasing the resulting error rate.

The OFDM signal is generated from the digital baseband data by an inverse (fast) Fourier transform (IFFT), which is computationally complex, and as will be discussed below, generates a resulting signal having a relatively high peak to average power ratio (PAPR) for a set including a full range of symbols. This high PAPR, in turn generally leads to increased acquisition costs and operating costs for the power amplifier (PA), and typically a larger non-linear distortion as compared to systems designed for signals having a lower PAPR. This non-linearity leads, among other things, to clipping distortion and intermodulation (IM) distortion, which have the effect of dissipating power, causing out-of-band interference, and possibly causing in-band interference with a corresponding increase in bit error rate (BER) at a receiver.

In a traditional type OFDM transmitter, a signal generator performs error correction encoding, interleaving, and symbol mapping on an input information bit sequence to produce transmission symbols. The transmission symbols are subjected to serial-to-parallel conversion at the serial-to-parallel (S/P) converter and converted into multiple parallel signal sequences. The S/P converted signal is subjected to inverse fast Fourier transform at the IFFT unit. The signal is further subjected to parallel-to-serial conversion at the parallel-to-serial (P/S) converter, and converted into a signal sequence. Then, guard intervals are added by the guard interval (GI) adding unit. The formatted signal is then up-converted to a radio frequency, amplified at the power amplifier, and finally transmitted as an OFDM signal by a radio antenna.

On the other hand, in a traditional type OFDM receiver, the radio frequency signal is down-converted to baseband or an intermediate frequency, and the guard interval is removed from the received signal at the guard interval removing unit. Then, the received signal is subjected to serial-to-parallel conversion at S/P converter, fast Fourier transform at the fast Fourier transform (FFT) unit, and parallel-to-serial conversion at P/S converter. Then, the decoded bit sequence is output.

It is conventional for each OFDM channel to have its own transmit chain, ending in a power amplifier (PA) and an antenna element. However, in some cases, one may wish to transmit two or more separate OFDM channels using the same PA and antenna, as shown in FIG. 3. This is sometimes called "carrier aggregation". This may permit a system with additional communications bandwidth on a limited number of base-station towers. Given the drive for both additional users and additional data rate, this is highly desirable. The two channels may be combined at an intermediate frequency using a two-stage up-conversion process as shown in FIG. 3. Although amplification of real baseband signals is shown in FIG. 3, in general one has complex two-phase signals with in-phase and quadrature up-conversion (not shown). FIG. 3 also does not show the boundary between digital and analog signals. The baseband signals are normally digital, while the RF transmit signal is normally analog, with digital-to-analog conversion somewhere between these stages.

Consider two similar channels, each with average power $P_0$ and maximum instantaneous power $P_1$. This corresponds to a peak-to-average power ratio $PAPR=P_1/P_0$, usually expressed in dB as $PAPR[dB]=10 \log(P_1/P_0)$. For the combined signal, the average power is $2 P_0$ (an increase of 3 dB), but the maximum instantaneous power can be as high as $4 P_0$, an increase of 6 dB. Thus, PAPR for the combined signal can increase by as much as 3 dB. This maximum power will occur if the signals from the two channels happen to have peaks which are in phase. This may be a rare transient occurrence, but in general the linear dynamic range of all transmit components must be designed for this possibility. Nonlinearities will create intermodulation products, which will degrade the signal and cause it to spread into undesirable regions of the spectrum. This, in turn, may require filtering, and in any case will likely reduce the power efficiency of the system.

Components with required increases in linear dynamic range to handle this higher PAPR include digital-to-analog converters, for example, which must have a larger number of effective bits to handle a larger dynamic range. But even more important is the power amplifier (PA), since the PA is generally the largest and most power-intensive component in the transmitter. While it is sometimes possible to maintain components with extra dynamic range that is used only a small fraction of the time, this is wasteful and inefficient, and to be avoided where possible. An amplifier with a larger dynamic range typically costs more than one with a lower dynamic range, and often has a higher quiescent current drain and lower efficiency for comparable inputs and outputs.

This problem of the peak-to-average power ratio (PAPR) is a well-known general problem in OFDM and related waveforms, since they are constructed of multiple closely-spaced subchannels. There are a number of classic strategies to reducing the PAPR, which are addressed in such review articles as "Directions and Recent Advances in PAPR Reduction Methods", Hanna Bogucka, Proc. 2006 IEEE International Symposium on Signal Processing and Information Technology, pp. 821-827, incorporated herein by reference. These PAPR reduction strategies include amplitude clipping and filtering, coding, tone reservation, tone injection, active constellation extension, and multiple signal representation techniques such as partial transmit sequence (PTS), selective mapping (SLM), and interleaving. These techniques can achieve significant PAPR reduction, but at the expense of transmit signal power increase, bit error rate (BER) increase, data rate loss, increase in computational complexity, and so on. Further, many of these techniques require the transmission of additional side-information (about the signal transformation) together with the signal itself, in order that the received signal be properly decoded. Such side-information reduces the generality of the technique, particularly for a technology where one would like simple mobile receivers to receive signals from a variety of base-station transmitters. To the extent compatible, the techniques disclosed in Bogucka, and otherwise known in the art, can be used in conjunction with the techniques discussed herein-below.

Various efforts to solve the PAPR (Peak to Average Power Ratio) issue in an OFDM transmission scheme, include a frequency domain interleaving method, a clipping filtering method (See, for example, X. Li and L. J. Cimini, "Effects of Clipping and Filtering on the Performance of OFDM", IEEE Commun. Lett., Vol. 2, No. 5, pp. 131-133, May, 1998), a partial transmit sequence (PTS) method (See, for example, L. J Cimini and N. R. Sollenberger, "Peak-to-Average Power Ratio Reduction of an OFDM Signal Using Partial Transmit Sequences", IEEE Commun. Lett., Vol. 4, No. 3, pp. 86-88, March, 2000), and a cyclic shift sequence (CSS) method (See, for example, G. Hill and M. Faulkner, "Cyclic Shifting and Time Inversion of Partial Transmit Sequences to Reduce the Peak-to-Average Ratio in OFDM", PIMRC 2000, Vol. 2, pp. 1256-1259, September 2000). In addition, to improve the receiving characteristic in OFDM transmission when a non-linear transmission amplifier is used, a PTS method using a minimum clipping power loss scheme (MCPLS) is proposed to minimize the power loss clipped by a transmission amplifier (See, for example, Xia Lei, Youxi Tang, Shaoqian Li, "A Minimum Clipping Power Loss Scheme for Mitigating the Clipping Noise in OFDM", GLOBECOM 2003, IEEE, Vol. 1, pp. 6-9, December 2003). The MCPLS is also applicable to a cyclic shifting sequence (CSS) method.

In a partial transmit sequence (PTS) scheme, an appropriate set of phase rotation values determined for the respective subcarriers in advance is selected from multiple sets, and the selected set of phase rotations is used to rotate the phase of each of the subcarriers before signal modulation in order to reduce the peak to average power ratio (See, for example, S. H. Muller and J. B. Huber, "A Novel Peak Power Reduction Scheme for OFDM", Proc. of PIMRC '97, pp. 1090-1094, 1997; and G. R. Hill, Faulkner, and J. Singh, "Deducing the Peak-to-Average Power Ratio in OFDM by Cyclically Shifting Partial Transmit Sequences", Electronics Letters, Vol. 36, No. 6, 16 March, 2000).

When multiple radio signals with different carrier frequencies are combined for transmission, this combined signal typically has an increased PAPR, owing to the possibility of in-phase combining of peaks, requiring a larger power amplifier (PA) operating at low average efficiency. As taught by U.S. Pat. No. 8,582,687 (J. D. Terry), expressly incorporated herein by reference in its entirety, the PAPR for digital combinations of OFDM channels may be reduced by a Shift-and-Add Algorithm (SAA): Storing the time-domain OFDM signals for a given symbol period in a memory buffer, carrying out cyclic time shifts to transform at least one OFDM signal, and adding the multiple OFDM signals to obtain at least two alternative combinations. In this way, one can select the time-shift corresponding to reduced PAPR of the combined multi-channel signal. This may be applied to signals either at baseband, or on upconverted signals. Several decibels reduction in PAPR can be obtained without degrading system performance. No side information needs to be transmitted to the receiver, provided that the shifted signal can be demodulated by the receiver without error. This is shown schematically in FIG. 4.

Some OFDM protocols may require a pilot symbol every symbol period, where the pilot symbol may be tracked at the receiver to recover phase information (see FIG. 5). If the time-shift is performed on a given OFDM carrier, according to such a protocol, during a specific symbol period, the pilot symbol will be subject to the same time-shift, so that the receiver will automatically track these time-shifts from one symbol period to the next. However, as indicated in FIG. 2, typical modern OFDM protocols incorporate a sparser distribution of pilot symbols, with interpolation at the receiver to generate virtual pilot symbols (reference signals) for other locations. With such a protocol, an arbitrary time shift as implemented in the SAA may not be properly tracked, so that without side information, bit errors may be generated at the receiver.

What is needed is a practical method and associated apparatus for reducing the PAPR of combined OFDM signals in a wide variety of modern OFDM protocols, in a way that does not degrade the received signal or require the transmission of side-information.

The following patents, each of which are expressly incorporated herein by reference, relate to peak power ratio considerations: U.S. Pat. Nos. 7,535,950; 7,499,496; 7,496,028; 7,467,338; 7,463,698; 7,443,904; 7,376,202; 7,376,074; 7,349,817; 7,345,990; 7,342,978; 7,340,006; 7,321,629; 7,315,580; 7,292,639; 7,002,904; 6,925,128; 7,535,950; 7,499,496; 7,496,028; 7,467,338; 7,443,904; 7,376,074; 7,349,817; 7,345,990; 7,342,978; 7,340,006; 7,339,884; 7,321,629; 7,315,580; 7,301,891; 7,292,639; 7,002,904; 6,925,128; 5,302,914; 20100142475; 20100124294; 20100002800; 20090303868; 20090238064; 20090147870; 20090135949; 20090110034; 20090110033; 20090097579; 20090086848; 20090080500; 20090074093; 20090067318; 20090060073; 20090060070; 20090052577; 20090052561; 20090046702; 20090034407; 20090016464; 20090011722; 20090003308; 20080310383; 20080298490; 20080285673; 20080285432; 20080267312; 20080232235; 20080112496; 20080049602; 20080008084; 20070291860; 20070223365; 20070217329; 20070189334; 20070140367; 20070121483; 20070098094; 20070092017; 20070089015; 20070076588; 20070019537; 20060268672; 20060247898; 20060245346; 20060215732; 20060126748; 20060120269; 20060120268; 20060115010; 20060098747; 20060078066; 20050270968; 20050265468; 20050238110; 20050100108; 20050089116; and 20050089109.

The following patents, each of which is expressly incorporated herein by reference, relate to one or more topics in wireless radio-frequency communication systems: U.S. Pat. Nos. 8,130,867; 8,111,787; 8,204,141; 7,646,700; 8,520,494; 20110135016; 20100008432; 20120039252; 20130156125; 20130121432; 20120328045; 2013028294; 2012275393; 20110280169; 2013001474; 20120093088; 2012224659; 20110261676; WO2009089753; WO2013015606, 20100098139; 20130114761; WO2010077118A2.

See, also, each of which is expressly incorporated herein by reference:

Aboul-Dahab, Mohamed A., Esam A A A Hagras, and Ahmad A. Elhaseeb. "PAPR Reduction Based on DFT Precoding for OFDM Signals." International Journal of Future Computer and Communication, Vol. 2, No. 4, August 2013. www.ijfcc.org/papers/177-C026.pdf Alharbi, et al., "A combined SLM and closed-loop QO-STBC for PAPR mitigation in MIMO-OFDM transmission". www.eurasip.org/proceedings/Eusipco/Eusipco2008/papers/1569102063 2008

Al-Kebsi, et al., "Throughput enhancement and performance improvement of the OFDM based WLAN system", IJCSNS International Journal of Computer Science and Network Security, vol. 9, no. 4, April 2009

Andgart, et al., "Designing Tone Reservation PAR reduction", EURASIP Journal on applied Signal Processing, vol 2006, article ID 38237, pages 1-14

Anonymous, "Peak-to-average power ratio (PAPR)", Wireless Inf. Trans. System Lab., Mar. 2, 2006

Baig, Imran, and Varun Jeoti. "DCT precoded SLM technique for PAPR reduction in OFDM systems." In Intelligent and Advanced Systems (ICIAS), 2010 International Conference, pp. 1-6. IEEE, 2010.

Bassam, S., et al. "Transmitter Architecture for CA: Carrier Aggregation in LTE-Advanced Systems." IEEEMicrowave Magazine, Vol. 14, No. 5 (2013): 78-86.

Baxley, "Analyzing selected mapping for peak-to-average power reduction in OFDM", Thesis, School of Electrical and Computer Engineering, Georgia Institute of Technology, May 2005

Baxley, et al., "Assessing peak-to-average power ratios for communications applications", Proc. IEEE Military Communications Conf (MILCOM 2004).

Baxley, et al., "Ordered phase sequence testing in SLM for improved blind detection", Proc. 2005 IEEE Conf on Signal Processing Advances in Wireless Communication.

Behravan, et al., "Iterative estimation and cancellation of nonlinear distortion in OFDM systems", www.mantracom.com/downloads Jun. 19, 2008

Boccardi, et al., "The p-sphere encoder: vector precoding with low peak-power for the MIMO Gaussian Broadcast Channel", IEEE Trans. Comm., vol. 54, p. 1703, September 2006.

Bonaccorso, et al., "Reducing the peak to average power ratio in OFDM systems", Dix-septieme colloque GRETSI, Vannes, Sep. 13-17, 1999

Boonsrimuang, et al., "Mitigation of non-linear distortion using PTS and IDAR method for multi-level QAM-OFDM system", ECTI Transactions on Computer and Information Technology, vol. 1, no. 2, November 2005

Breiling, et al., "Distortionless reduction of peak power without explicit side information", 2000 IEEE Global Telecommunications Conference.

Breiling, et al., "SLM peak-power reduction without explicit side information", IEEE Communications Letters, vol. 5, no. 6, June 2001

Chen, et al., "A modified selective mapping with PAPR reduction and error correction in OFDM systems", 2007 IEEE Wireless Com. and Networking Conf., pp. 1329-1333.

Chen, Jung-Chieh, Chao-Kai Wen, and Pangan Ting. "An Efficient Pilot Design Scheme for Sparse Channel Estimation in OFDM Systems" Communications Letters, IEEE 17.7 (2013): 1352-1355.

Chen, Jung-Chieh. "Partial transmit sequences for PAPR reduction of OFDM signals with stochastic optimization techniques", Consumer Electronics, IEEE Transactions on 56, no. 3 (2010): 1229-1234.

Choi, et al., "Peak power reduction scheme based on subcarrier scrambling for MC-CDMA systems", IEE Proceedings on Communications, vol. 151, pp. 39-43, February 2004.

Ciochina, et al., "An analysis of OFDM peak power reduction techniques for WiMAX systems" Proc. 2006 Int. Conf on Communications, pp. 4676-4681.

Daoud, O., et al., "PAPR Reduction by Linear Coding Techniques for MIMO-OFDM Systems Performance Improvement: Simulation and Hardware Implementation", European Journal of Scientific Research, Vol. 36 No. 3 (2009), pp 376-393

De Figueiredo, "Adaptive pre-distorters for linearization of high power amplifiers in OFDM wireless communications", IEEE North Jersey Section CASS/EDS Chapter, Distinguished lecture Deng, et al., "OFDM PAPR reduction using clipping with distortion control", Proc. 2005 IEEE Conf. on Communications.

Deumal, et al., "Peak reduction of multi-carrier systems by controlled spectral outgrowth", Proc. IEEE Intl. Conf. on Acoustics, Speech and Signal Processing (ICASSP), 2006.

Devlin, et al., "Gaussian pulse based tone reservation for reducing PAPR of OFDM signals", 2007 IEEE Vehicular Technol. Conf.

Dong, Min, and Lang Tong. "Optimal design and placement of pilot symbols for channel estimation", Signal Processing, IEEE Transactions on 50.12 (2002): 3055-3069.

Fischer, "Peak-to-average power ratio (PAR) reduction in OFDM based on lattice decoding", Proc. Int. OFDM Workshop.

Fischer, "Widely-linear selected mapping for peak-to-average power ratio reduction in OFDM", Electronics Letters, vol. 43, 2007.

Fischer, et al., "Directed selected mapping for peak-to-average power ratio reduction in MIMO OFDM", Proc. International OFDM Workshop, 2007.

Fischer, et al., "Peak-to-average power ratio reduction in MIMO OFDM", Proc. 2007 Int. Conf on Communications, pp. 762-767.

Fischer, et al., "Peak-to-average power ratio reduction in single- and multi-antenna OFDM via directed selected mapping", Jul. 19, 2007

Fischer, et al., "Signal shaping for peak-power and dynamics reduction in transmission schemes employing precoding", IEEE Trans. on Comm., v. 50, pp. 735-741, May 2002.

Giannopoulos, et al., "Novel efficient weighting factors for PTS-based PAPR reduction in low-power OFDM transmitters", www.eurasip.org/proceedings/Eusipco/Eusipco2006/papers/1568982220 2006

Giannopoulos, et al., "Relationship among BER, power consumption and PAPR", 2008 IEEE Int. Symp. on Wireless Pervasive Computing, pp. 633-637.

Guel, et al., "Approximation of the average power variation for geometric adding signal approach of PAPR reduction in context of OFDM signals", Union Radio Scientifique Internationale-URSI, Aug. 7-16, 2008, Chicago, Ill.

Habendorf, et al., "Nonlinear predistortion with reduced peak-to-average power ratio", Proc. International Symposium on Wireless Communications.

Haider, "Peak to average ratio reduction in wireless OFDM communication systems", Thesis, Blekinge Institute of Technology, January 2006

Henkel, et al., "Another application for trellis shaping: PAR reduction for DMT (OFDM)," IEEE Transactions on Communications, vol. 48, no. 9, September 2000

Henkel, et al., "Partial transmit sequences and trellis shaping", Proc. 5th Int. ITC Conf. on Source and Channel Coding, 2004.

Herraiz, "Multicarrier communication systems with low sensitivity to nonlinear amplification", Thesis, Eng. i Arquitectura La Salle, Univers. Ramon Llull, Barcelona 2008

Hosseini, et al., "PAPR reduction in OFDM systems using polynomial-based compressing and iterative expanding", 2006 IEEE ICASSP.

Hussain, et al., "Peak to average power ratio reduction for multi-band OFDM system using tone reservation", www.ursi-test.intec.ugent.be/files/URSIGA08/papers/CPS2p5 2008

Hussain, Et Al., "Tone reservation's complexity reduction using fast calculation of maximal IDFT element", IEEE, IWCMC 08, Greece (2008)

Hussein, et al., "Performance enhancement of STBC OFDM-CDMA system using channel coding techniques over multipath fading channel", Journal of Theoretical and Applied Information Technology, Vol. 5, No. 5, pp. 591-601, June, 2009.

Ikeda, Yuji, Issei Kanno, Tom Kitayabu, and Hiroyasu Ishikawa. "Proposal of cross-carrier precoding for carrier aggregation enhancement." In Personal Indoor and Mobile Radio Communications (PIMRC), 2011 IEEE 22nd International Symposium on, pp. 1738-1742. IEEE, 2011.

Jafari, "Adaptive lattice reduction in MIMO systems", Thesis, University of Waterloo, Canada, 2008

Jayalath, et al., "On the PAR reduction of OFDM signals using multiple signal representation", IEEE Communications Letters, vol. 8, no. 7, July 2004

Jayalath, et al., "SLM and PTS peak-power reduction of OFDM signals without side information", IEEE Trans. on Wireless Communications, vol. 4, no. 5, September 2005

Jayalath, et al., "Use of data permutation to reduce the peak-to-average power ratio of an OFDM signal", Wireless Communications and Mobile Computing, 2002, 2:187-203

Jiang, et al., "Two novel nonlinear companding schemes with iterative receiver to reduce PAPR in multi-carrier modulation systems", IEEE Transaction on Broadcasting, vol. 52, pp. 268-273, June 2006.

Jimenez et al., "Study and Implementation of complementary Golay sequences for PAR reduction in OFDM signals", Proc. 11th Med. Electrotech. Conf. MELECON 2002, pp. 198-203.

Kasiri, et al., "A preprocessing method for PAPR reduction in OFDM systems by modifying FFT and IFFT matrices", The 18th Annual IEEE International Symposium on Personal, Indoor and Mobile Radio Communications (PIMRC'07)

Kaur, Inderjeet, et al., "The Minimum PAPR Code for OFDM Systems", World Academy of Science, Engineering and Technology 46 2008 p. 285.

Kim, Hyunju, et al. "A pilot symbol pattern enabling data recovery without side information in PTS-based OFDM systems", Broadcasting, IEEE Transactions on 57.2 (2011): 307-312.

Kim, Kee-Hoon, Hyun-Bae Jeon, Jong-Seon No, and Dong-Joon Shin. "Low-complexity selected mapping scheme using cyclic-shifted inverse fast Fourier transform for peak-to-average power ratio reduction in orthogonal frequency division multiplexing systems." IET Communications 7, no. 8 (2013): 774-782.

Lee et al., "Novel low-complexity SLM schemes for PAPR reduction in OFDM systems", Proc. 2008 IEEE Global Telecommunications Conf GLOBECOM 2008.

Lee, et al., "Unitary peak power reduction for short packet communications in multiple transmit antennas", IEEE Trans. Commun., vol. 56, February 2008, pp. 234-244.

Lin, "Performance analysis in the PAPR of OFDM system via SLM scheme", Master Thesis, Institute of Communication Engineering, Tatung University, January 2004

Lin, et al., "Selective-mapping type peak power reduction techniques for turbo coded OFDM", 2005 International Conference on Wireless Networks, Communications and Mobile Computing Long, Ken, Yue Fu, and Yi Wang. "The contradiction between channel estimation and PAPR performance in cyclic shift PTS." In Biomedical Engineering and Informatics (BMEI), 2012 5th International Conference, pp. 1525-1528. IEEE, 2012.

Loyka, et al., "On the peak factor of sampled and continuous signals", Proc. 2006 IEEE Vehicular Technology Conf.

Malkin, et al., "Dynamic allocation of reserved tones for PAR reduction", OFDM Workshop, August 2008, Hamburg Germany Malkin, et al., "Optimal constellation distortion for PAR reduction in OFDM systems", Proc. 2008 PIMRC.

Marsalek, "On the reduced complexity interleaving method for OFDM PAPR reduction", Radioengineering, vol. 1, no 3, September 2006

Matejka, "DRM PAPR distribution and its relation to classical AM power amplifier", www.urel.feec.vutbr.cz/ra2008/archive/ra2003/papers/169.pdf, Radioelektronika 2003

Mobasher, et al., "Integer-based constellation shaping method for PAPR reduction in OFDM systems", IEEE Transactions on Communications, vol. 54, pp. 119-126, January 2006.

Muller, et al., "OFDM with reduced peak-to-average power ratio by multiple signal representation", Annals of Telecommunications, vol. 52, no 1-2, pp. 58-67, February 1997

Nam, Young-Han, et al. "Evolution of reference signals for LTE-advanced systems." IEEE Communications Magazine, 50.2 (2012): 132-138.

Namitha, A. S., and P. Sudheesh. "Improved Precoding Method for PAPR Reduction in OFDM with Bounded Distortion", International Journal of Computer Applications (0975-8887) 2(7):7-12, June 2010

Nawaz, et al., "PAPR reduction technique for OFDM systems with rotated MPSK constellations and coordinate interleaving", Proc. 2008 IEEE Symp on Comm. & Veh. Technol.

Ohno, Shuichi. "Preamble and pilot symbol design for channel estimation in OFDM." Acoustics, Speech and Signal Processing, 2007. ICASSP 2007. IEEE International Conference. Vol. 3, pp. 281-284, 2007.

Pakrooh, Pooria, Arash Amini, and Farokh Marvasti. "OFDM pilot allocation for sparse channel estimation." EURASIP Journal on Advances in Signal Processing 2012.1 (2012): 1-9.

Park, et al., "Tone reservation method for PAPR reduction scheme", IEEE 802.16e-03/60

Pise, et al., "Packet forwarding with multiprotocol label switching" World Academy of Science, Engineering and Technology 12 2005

Pradabpet, et al., "A new PAPR reduction in OFDM systems using PTS combined with APPR for TWTA nonlinear HPA", Songklanakarin J. Sci. Technol. 30 (3), 355-360, May-June 2008

Pradabpet, et al., "A new PTS method using GA for PAPR reduction in OFDM-WLAN 802.11a systems", www.jc-sse.org/slide/comp_int/P0014.pdf Qi, Chenhao, and Lenan Wu. "A Study of Deterministic Pilot Allocation for Sparse Channel Estimation in OFDM Systems." Communications Letters, IEEE 16.5 (2012): 742-744.

Rabiei, Payam, Won Namgoong, and Naofal Al-Dhahir. "Pilot design for OFDM systems in the presence of phase noise", Signals, Systems and Computers 2010, Conference Record of the 44th Asilomar Conference, IEEE, 2010, pp. 516-520.

Ragusa, et al., "Invertible clipping for increasing the power efficiency of OFDM amplification", Proc. 2007 IEEE Int. Symposium on Personal Indoor and Mobile Radio Communications.

Rahmatallah, Yasir and Seshadri Mohan, "Peak-To-Average Power Ratio Reduction in OFDM Systems: A Survey And Taxonomy", IEEE COMMUNICATIONS SURVEYS & TUTORIALS, 2013, vol. 15, 1567-1592.

Rajbanshi, "OFDM-based cognitive radio for DSA networks", Technical Report, The University of Kansas (2007)

Rajbanshi, et al., "Adaptive-mode peak-to-average power ratio reduction algorithm for OFDM-based cognitive radio", 2006 IEEE Vehicular Technology Conf.

Rajbanshi, et al., "OFDM symbol design for peak-to-average power ratio reduction employing non-data bearing subcarriers", Proc. 2008 IEEE Wireless Communications and Networking Conference, pp. 554-558.

Rajbanshi, et al., "Peak-to-average power ratio analysis for NC-OFDM transmissions", Proc. 2007 IEEE Vehicular Technology Conference.

Ren, "An improved selected mapping scheme for PAPR reduction in OFDM systems", Thesis, University of Cincinnati Saito, et al., "PAPR reduction of MC-CDMA signals by selected mapping with interleavers", Multi-Carrier Spread-Spectrum, Springer Netherlands, pp. 453-460

Sari, "OFDM peak power reduction techniques performance analysis for WiMAX Systems" Sequans Communications, 4th Annual Wireless Broadband Forum (2005).

Sathananthan, et al., "Reducing intercarrier interference in OFDM systems by partial transmit sequence and selected mapping", Proc. Int'l. Symp. on DSP for Comm. Systems, 2002.

SchenK, et al., "Peak-to-average power reduction in space division multiplexing based OFDM systems through spatial shifting", Electronics Letters, Jul. 21, 2005, vol. 41, no. 15

Schenk, et al., "The application of spatial shifting for peak-to-average power ratio reduction in MIMO OFDM systems", Proc. 2006 IEEE Vehicular Technol. Conf.

Schurgers, et al., "A systematic approach to peak-to-average power ratio in OFDM", Proc. SPIE vol. 4474, p. 454 (2001).

Sezginer, et al., "Metric-based symbol predistortion techniques for peak power reduction in OFDM systems", IEEE Trans. on Wireless Communications, vol. 6, no. 7, July 2007

Sharif, et al., "On the peak-to-average power of OFDM signals based on oversampling", IEEE Transactions on Communications, vol. 51, no. 1, January 2003

Siegl, et al., "Directed selected mapping for peak-to-average power ratio reduction in single-antenna OFDM", Proc. Int. OFDM Workshop.

Siegl, et al., "Partial transmit sequences for Peak-to-average power ratio reduction in multiantenna OFDM", EURASIP Journal on Wireless Communications and Networking, vol. 2008, article ID 325829, 11 pages Siegl, et al., "Peak-to-average power ratio reduction in multi-user OFDM", Proc. 2007 IEEE Int. Symp. on Information Theory.

Šimko, Michal, et al. "New Insights in Optimal Pilot Symbol Patterns for OFDM Systems." Proc. of IEEE Wireless Communication and Networking Conference (WCNC 2013), Shanghai, China. pp. 3737-3741, 2013.

Slimane, Slimane Ben. "Reducing the peak-to-average power ratio of OFDM signals through precoding." Vehicular Technology, IEEE Transactions on 56, no. 2 (2007): 686-695.

Sohn, "RBF neural network based SLM peak-to-average power ratio reduction in OFDM systems", ETRI Journal, Volume 29, Number 3, June 2007

Srikanth, S., Murugesa Pandian, and Xavier Fernando. "Orthogonal frequency division multiple access in WiMAX and LTE: a comparison", Communications Magazine, IEEE 50.9 (2012): 153-161.

Srivastava, Gauraw Kumar, and Naresh Kumar Tadkapalli. "Crest factor reduction for carrier aggregated OFDM systems." In Software, Telecommunications and Computer Networks (SoftCOM), 2012 20th International Conference on, pp. 1-6. IEEE, 2012.

Taha, "Performance analysis of ICC technique for OFDM PAPR reduction and its application over BTC," Master's degree project, Stockholm, Sweden 2006

Ting-Jung Liang et al., "Synchronization in OFDM-based WLAN with Transmit and Receive Diversities", in IEEE 16th Intl. Symp. on Personal, Indoor and Mobile Radio Comm., PIMRC 2005., vol. 2, 11-14 Sep. 2005, pp. 740-744.

Tsai, et al., "A tail-biting turbo coded OFDM system for PAPR and BER reduction", 2007 IEEE Vehicular Technology Conference.

Tseng, et al., "A reduced-complexity PTS scheme for peak-to-average power ratio reduction in OFDM systems", Proc. European Society for Signal Processing (EURASIP) 2008.

Tufvesson, Fredrik, and Torleiv Maseng. "Pilot assisted channel estimation for OFDM in mobile cellular systems." In Vehicular Technology Conference, 1997, IEEE 47th, vol. 3, pp. 1639-1643. IEEE, 1997.

Valbonesi, et al., "Low-complexity method for PAPR reduction in OFDM based on frame expansion parameter selection", 13th European Signal Processing Conference, Sep. 4-8, 2005, Antalya, Turkey Van Welden, et al., "Clipping versus symbol switching for PAPR reduction in coded OFDM", 15th Annual Symposium of the IEEE/CVT Benelux Chapter, Nov. 13, 2008

Veeragandham, "Orthogonal frequency division multiplexing" EECS 865: Wireless Communications Vijayarangan, et al., "An overview of techniques for reducing peak to average power ratio and its selection criteria for orthogonal frequency division multiplexing radio systems", Journal of Theoretical and Applied Information Technology, vol. 5, no. 5 (February 2009).

Vijayarangan, et al., "Reducing peak to average power ratio in orthogonal frequency division multiplexing using modified peak factor mapping", IE(I) Journal-ET (February, 2008)

Wang, "PAPR reduction for OFDM", circa 2007

Wang, "Peak to average power ratio reduction for OFDM", Research & Standards LGE Mobile Research, USA, Aug. 27, 2007, 3GPP2, TSG-C NTAH.

Wang, "Reduction of the PAPR in OFDM signals by applying PTS mechanism", Master Thesis, Institute of Communication Engineering, Tatung University, January 2004

Wei, et al., "A modern extreme value theory approach to calculating the distribution of the peak-to-average power ratio in OFDM systems", 2002 IEEE Int. Conf. on Communications, vol. 3, pp. 1686-1690.

Wen, et al., "A sub-optimal PTS algorithm based on particle swarm optimization technique for PAPR reduction in OFDM systems", EURASIP J. Wireless Commun. and Networking (January 2008).

Wen, et al., "The PAPR reduction in OFDM system with the help of signal mapping scheme", International Journal of Applied Science and Engineering 2007, 5, 1: 75-80

Wesolowski, "On the PAPR minimization using selected mapping algorithm in pilot-assisted OFDM systems", Proc. European Wireless Conference, 2007.

Wu, et al., "8B/10B Codec for efficient PAPR reduction in OFDM communication systems", IEEE Int'l Conf. on Wireless Communications, Networking and Mobile Computing (WCNMC), Jun. 13-16, 2005, Maui, Hi., USA.

Wu, et al., "Peak-to-average power ratio reduction in OFDM based on transformation of partial transmit sequences", Electronics Letters, Jan. 19, 2006, vol. 42, no. 2

Wulich, et al., "Is PAPR reduction always justified for OFDM?", Proc. European Wireless Conference, 2007.

Xiong, Banglong; Zhu, Xinning; Li, Wei; Guo, Gan, "Analysis of Maximum Power Reduction of Uplink for Carrier Aggregation in LTE-A System," Connected Vehicles and Expo (ICCVE), 2012 International Conference, pp. 49-54, 12-16 Dec. 2012

Yang, et al., "Selective vector perturbation precoding and peak to average power ratio reduction of OFDM systems", Proc. IEEE Global Telecommunications Conf., 2008.

Yang, L., K. K. Soo, S. Q. Li, and Y. M. Siu, "PAPR reduction using low complexity PTS to construct of OFDM signals without side information." Broadcasting, IEEE Transactions on 57, no. 2 (2011): 284-290.

Yen, Pochun, and Hlaing Minn, "Low complexity PAPR reduction methods for carrier-aggregated MIMO OFDMA and SC-FDMA systems." EURASIP Journal on Wireless Communications and Networking 2012.1 (2012): 1-13.

Yen, Pochun, Hlaing Minn, and Chia-Chin Chong. "PAPR reduction for bandwidth-aggregated OFDM and SC-FDMA systems." In Wireless Communications and Networking Conference (WCNC), 2011 IEEE, pp. 1363-1368. IEEE, 2011.

Zelenkov, A. V., and A. Litvinenko. "OFDM PAPR reduction by pre-scrambling and clipping." Electronics Conference (BEC), 2012 13th Biennial Baltic. IEEE, 2012, pp. 141-144.

Zhao, "Distortion-based crest factor reduction algorithms in multi-carrier transmission systems", A Dissertation, Georgia Institute of Technology, December 2007

Zhao, et al., "A study on the PAPR reduction by hybrid algorithm based on the PTS and GS technique", The Journal of the Korean Institute of Communication Sciences, Vol. 31, No. 2A, p. 187, February 2006.

SUMMARY OF THE INVENTION

The present invention extends and generalizes the prior art of Terry (U.S. Pat. No. 8,582,687) in the carrier aggregation of two or more OFDM signals in different frequency bands. For a preferred embodiment, consider a first and a second OFDM signal to be combined and transmitted, where in a given symbol period, the candidate signal transformations of the first OFDM signal are restricted to those that can be demodulated by a receiver without side information (see FIG. 6). For example, the digital processor at the transmitter (the "transmit processor") can use the pilot symbols previously transmitted for the first signal to interpolate the same virtual pilot symbols (reference signals) that are also generated by the receiver. Then the transmit processor can select at least two versions of the first OFDM signal that are compatible with the receive protocol. Each of these at least two OFDM signal versions can be combined with the second OFDM signal at a different frequency (carrier aggregation) as per the prior art Terry algorithm, and the PAPR (or other figure of merit) for the combined signal can be evaluated. In this way, the optimization can be restricted to appropriate signal candidates, without wasting computational resources on unacceptable alternatives.

This method can be further generalized beyond OFDM for any present or future communications system based on multiple subchannels, which might be labeled MSM (multiple subchannel multiplexing). Typically, such subchannels are orthogonal, that is, not subject to intersymbol interference across channels, but this is not an absolute requirement, since in various instances, such interference can be resolved, and in any case when subject to significant Doppler shifts, true orthogonality may be lost. On the other hand, signals may be defined absent strict orthogonality, but be received as orthogonal signals, for example, due to Doppler shifts.

The subchannels are typically frequency channels, such that the subchannels represent a series of frequency assignments within a channel which occupies a range of frequencies. In some cases, however, the subchannels may correspond to other assignments. For example, a typical scheme for generating subchannels in an orthogonal frequency division multiplexed (OFDM) signal is to modulate a signal by performing an inverse fast Fourier transform (IFFT) at the transmitter to generate the orthogonal frequency subcarriers, and perform a fast Fourier transform (FFT) at the receiver to demodulate the information from the subcarriers. Typically, a sparse selection of the subcarriers over time and over frequency communicate pilot signals, which permit calibration of the receiver to account for channel conditions. One issue addressed by the present technology is that a time shift of the entire OFDM signal can lead, under some conditions of the time shift and the frequency subchannel placement of the pilot signal, to a failure of an ability to properly receive the pilot signal, and therefore represents an invalid combination of pilot frequency and cyclic shift. Therefore according to one aspect of the technology, a proposed cyclic shift of a multiple subchannel modulated signal is tested against a model of the receiver and/or the channel conditions and receiver, to ensure compatibility with successful receipt of the pilot signal(s) communicated within a symbol period.

The technology can be extended to non-frequency subchannel assignments, for example when the transform used a the transmitter is a different transform, for example, an inverse wavelet transform with a corresponding wavelet transform performed at the receiver. See, each of which is expressly incorporated herein by reference in its entirety:

Rohit Bodhe et al., "Design Of Simulink Model For OFDM and Comparison of FFT-OFDM and DWT-OFDM", International Journal of Engineering Science and Technology (BEST) Vol. 4 No. 05, May 2012 pp. 1914-1924; 1. Communication Systems, 4th edition, Simon Haykin, John Wiley and Sons, Inc.;

C. V. Bouwel, et. al, Wavelet Packet Based Multicarrier Modulation, IEEE Communications and Vehicular Technology, SCVT 200, pp. 131-138, 2000;

B. G. Nagesh, H. Nikookar, Wavelet Based OFDM for Wireless Channels, IEEE Vehicular Technology Conference, Vol. 1, pp. 688-691, 2001; LI Wiehua, et. al, Bi-orthogonal Wavelet Packet based Multicarrier modulation;

Haixia Zhang, et. al, Research of DFT-OFDM and DWT-OFDM on Different Transmission Scenarios. Proceeding of the second international conference on Information Technology for Application (ICITA 2004);

B. G. Negash and H. Nikookar, "Wavelet based OFDM for wireless channels," Vehicular Technology Conference, 2001;

A. N. Akansu and L. Xueming, "A comparative performance evaluation of DMT (OFDM) and DWMT (DSBMT) based DSL communications systems for single and multi-tone interference," Proceedings of the IEEE International Conference on Acoustics, Speech and Signal Processing, 1998;

Khaizuran Abdullah, "Performance of Fourier-Based and Wavelet-Based OFDM for DVB-T Systems", 2007 Australasian Telecommunication Networks and Applications Conference Dec. 2-5, 2007, Christchurch, New Zealand pp. 475-479 (2007);

Rohit Bodhe et al, "Performance Comparison of FFT and DWT based OFDM and Selection of Mother Wavelet for OFDM" (IJCSIT) International Journal of Computer Science and Information Technologies, Vol. 3 (3), 2012, pp. 3993-3997.

Similarly to OFDM, any such system may employ at least one pilot signal transmitted to the receiver, in order to calibrate the state of the communication channel. Since the channel state will vary with time and across subchannels (particularly in a mobile system with multipath and interference), the pilot signal may be interleaved among the signal data representation present in the subchannels over time. Typically, a small portion of the subchannels over time and over a range of different frequencies, will be allocated to transmitting pilot signals. This will permit the receiver to track the changing communication channel to minimize the error rate of received data. An adaptive system may be provided which alters the insertion of pilot signals interspersed in the data communication dependent on actual error rates and channel conditions. Thus, in a channel where the error rate is low, fewer pilot signals may be communicated, permitting higher peak data rates. Likewise, under different types of noise conditions, the pilot signals, which are provided to address changes in channel conditions, can be traded off against error correction signals, which address noise conditions.

Furthermore, the communication protocol should allow the received data representation to vary along at least one parameter (in addition to amplitude), in order to reflect the varying channel environment. A key aspect is the recognition that the transmitted signal may also incorporate allowable variation in this at least one parameter. In order to accurately determine the acceptable range of the allowable variation, the transmit processor may simulate how the receive processor for the given signal will make use of the current and prior pilot signals. If two or more signals or bands are combined (carrier aggregation), the degree of freedom associated with this allowed variation of the at least one parameter may be exploited to optimize a separate fitness criterion or figure of merit, such as a peak-to-average power ratio (PAPR) or a bit-error ratio (BER) that may vary with this degree of freedom. In the preferred embodiment described below, the degree of freedom is cyclic shifting of the signal (which would correspond to variation in the physical path length), but other transformations may also be possible, such as frequency shifting (emulating a Doppler shift), phase shifting, synthetic multipath (time delayed replica), and deviation from orthogonality for subcarriers. Furthermore, the description of the preferred embodiment in no way limits the scope of the invention. In order to identify appropriate signal transformation candidates, a preferred embodiment of the present invention builds on a set of digital signal processing techniques known in the prior art as "codebook transmission" or "codebook pre-weighting" or "precoding". Codebook transmission derives its origin from cryptography. A codebook contains a lookup table for coding and decoding; each word or phrase has one or more strings which replace it. More recently, the term precoding has been used in conjunction with closed loop beamforming techniques in multi-antenna wireless communication systems, where channel state information is sent to the transmitting device from the receiving device to optimize the transmission for the current state of the channel. See, for example, the Wikipedia entry on "Precoding": en.wikipedia.org/wiki/Precoding.

It should not be understood here that the present method for RF carrier aggregation relies on closed-loop or multi-antenna systems, but rather that similar mathematical techniques are applied. However, this similarity also enables straightforward integration of efficient carrier aggregation with multi-antenna and closed-loop communication systems.

Codebook techniques can generate a lookup table of channel responses corresponding to at least two different transformations of the pilot symbols for specific OFDM protocols, and corresponding allowable channel responses for those locations in the resource grid without any pilot symbols. This is indicated in the generalized flowchart shown in FIG. 7. By allowable, we mean that process steps depicted in FIG. 8 and FIG. 9 allow recovery of the OFDM data symbols with minimal or no degradation at the receiver beyond the effects due to the physical channel, and not requiring any additional side information.

A preferred embodiment of the present system and method (shown in FIG. 10 and FIG. 11) seeks to control the PAPR by storing the time-domain OFDM signals for a given symbol period in a memory buffer, and carrying out cyclic time shifts of at least one of the OFDM signals, in order to select the time-shift corresponding to a desired PAPR of the combined multi-channel signal. In most cases, it would be desired to reduce the PAPR to a minimum, but this is not a limitation of the technique, and the selected time-shift may be based on other criteria.

It is noted that each of the OFDM signals may be preprocessed in accordance with known schemes, and thus each may have been themselves processed to reduce an intrinsic PAPR, though preferably any preprocessing of the signals is coordinated with the processing of the combined signals to achieve an optimum cost and benefit. For example, where two separate signals are to be combined, each having a high PAPR, a resulting signal of reduced PAPR can be achieved if the peaks add out of phase, and thus cancel. Therefore, initial uncoordinated efforts to modify the input OFDM signals may have limited benefit.

It is further noted that the present system seeks to combine independently formatted OFDM signals, which are generally targeted to different receivers or sets of receivers, and these sets are typically not coordinated with each other. For example, in a cellular transceiver system, a base station may serve hundreds or thousands of cell phones, each phone monitoring a single OFDM broadcast channel, with the base station servicing multiple OFDM channels. It is particularly noted that each set of OFDM subcarriers is orthogonal, but the separate OFDM signals, and their subcarriers, are generally not orthogonal with each other. The OFDM signals may be in channels which are adjacent or displaced, and therefore a relative phase change between OFDM signals can occur during a single symbol period. Therefore, the PAPR must be considered over the entire symbol period.

Indeed, according to another embodiment of the method, it is not the PAPR of the signal which is analyzed for optimization, but rather an inferred error at the receiver. Thus, if the PAPR of the composite signal is high for only a small portion of a symbol period, such that the PA distorts or clips the signal at that time, but at most other times the combined signals are well within specification, the result may be an acceptable transmission which would likely result in a low error probability. Indeed, in some cases, the error probability may be lower than for signals with a lower absolute peak. Therefore, by employing a model of a receiver, which itself may include margins for specific communication channel impairments to specific receivers, and Doppler shifts (which may be determined, for example by analyzing return path characteristics), or over a range of possible variation, as part of the transmitter signal processing path, better performance may be available than by simply minimizing the PAPR.

The receiver model seeks to implement the critical functions of an idealized receiver compliant with the communication protocol, as well as optionally a channel conditions model or range of possible impairment condition models. In the case of an OFDM receiver, the received signal is demodulated, e.g., to baseband, and an FFT applied to separate subbands into frequency bins. In some timeframes, and some subbands, pilot signals are inserted instead of data, according to a predetermined protocol. If a small number of pilot signals are to be extracted from the OFDM signal, a Goertzel Algorithm may also be used. The receiver knows where these pilot signals are to be found, and analyzes these separately for various distortions which indicate channel conditions. Since channel conditions change slowly with respect to data frames, the pilot transmission may be sparse, and some data frames may not include pilot signals. The pilot signals are typically spread into different frequency bins, to map the conditions across the entire channel. The remaining frequency bins are then analyzed to extract the subband data. The pilot signal may be used to correct the demodulation of data from the information subbands, i.e., calibrate frequency bin boundaries in the presence of Doppler shift and the like.

When the OFDM signal is cyclically shifted, this appears to the receiver similar to a time shift (delay). Therefore, the cyclic shift is permissible to the receiver within the range of its permissible change in time delay between symbols. The receiver model therefore maintains in a memory the prior states of the time shifts, which will control the acceptability of a successive change in time shift.

According to the model, if the various pilot signals are sufficiently corrupted, the data cannot reliably be demodulated from the OFDM signal, and a packet retransmit, for example, is requested. In the receiver model at the transmitter according to the present technology, therefore, the modified OFDM signal, e.g., a cyclically shifted representation of the OFDM signal, is analyzed to ensure that the pilot signals contained in the stream of OFDM symbols may be properly detected, and therefore would likely be properly detected by a real receiver through a real communication channel.

According to another embodiment, the model is implemented using at least one lookup table, based on previous applied time shifts (cyclic shifts). Assuming that the receiver has a specified margin for time shifts between successive symbols or data blocks, the lookup table can then estimate the tolerable range of delay to be added or subtracted from the successive symbol or block, that will still be within the operating range of the receiver. According to this model, a demodulation is not per se required. The lookup table may in some cases be predetermined, but in others it can be adaptive. For example, different receivers may implement the standard differently, and thus have different tolerance for variations in delay. Since the identification of the receiver may not be available for the transmitter, it may be convenient to test the range of permissible delays at the beginning of a communications session, using the occurrence of retransmission requests to indicate the range of abilities. Note also that packets from the receiver to the transmitter, such as retransmission requests, may be analyzed for certain attributes of the channel conditions, such as relative speed (Doppler shift).

Another option is to modify the OFDM signal during all or a portion of the period in a manner which deviates from a standard protocol, which is, for example an IEEE-802 OFDM standard, WiFi, WiMax, DAB, DVB, non-orthogonal multi access schemes, 3G, 4G, or 5G cellular communication, LTE or LTE-Advanced signals, or the like, but which does not substantively increase a predicted BER (bit error rate) of a standard or specific receiver. For example, if the PAPR is high for a small portion a symbol period, such that if during a portion of the symbol period, one or more subcarriers were eliminated or modified, the PAPR would be acceptable, and the signal at the receiver would have sufficient information to be decoded using a standard receiver without significant increase in BER, then the transmitter could implement such modifications without need to transmit side information identifying the modifications which are necessary for demodulation. Another possible deviation is, for example, to frequency shift the signal (which mildly violates the orthogonality criterion), within the tolerance of a receiver to operate within a range of Doppler shifts which are equivalent to frequency shifts.

Consider two OFDM signals that are being combined as in FIG. 10. For simplicity, call Signal 1 (S1) the reference signal, and Signal 2 (S2) the modified signal. During each OFDM symbol period, the baseband digital data bits for each signal will be stored in memory. Assume that the Preamble has been stripped off, but the Cyclic Prefix CP remains. As indicated in FIG. 10 for one embodiment of the invention, the bits for the reference signal S1 are stored in a first-in-first-out (FIFO) shift register (SR). The corresponding bits for the modified signal S2 are stored in a circular shift register (CSR), so configured that the data contained can be rotated under program control. The data for both signals are first up-converted to an intermediate frequency (IF) and then combined (added), while maintaining digital format at a sampling frequency increased over the digital data rate. The combined IF signals are then subjected to a PAPR test, to determine whether the peak power level is acceptable, or, in other embodiments, whether other criteria are met. This might correspond, for example, to a PAPR of 9 dB. If the test is passed, then the data bits for the combined OFDM symbols are read out, to be subsequently reassembled into the full OFDM frame and up-converted to the full RF, for further amplification in the PA and transmission. According to another embodiment, a combined OFDM representation of the combined data is itself the source for the up-conversion.

More generally, once the parametric transformation (relative time-shift) to achieve the desired criteria is determined, the final signal is then formulated dependent on that parameter or a resulting representation, which may be the digital data bits of the baseband signal or a converted form thereof; in the latter case, the system may implement a series of transformations on the data, some of which are redundant or failed, seeking an acceptable one or optimum one; once that is found, it may not be necessary to repeat the series of transformations again. Likewise, the option of reverting to the original digital data and repeating the determined series of transformations allows a somewhat different representation to be formed in the register, for example one which is simplified or predistorted to allow consideration of analog component performance issues in the combining test.

Even more generally, the technique provides that each signal to be combined is provided with a range of one or more acceptable parameters, which may vary incrementally, algorithmically, randomly, or otherwise, and at least a portion of the possible combinations tested and/or analyzed for conformity with one or more criteria, and thereafter the combination of OFDM signals implemented using the selected parameter(s) from a larger set of available parameters. This parametric variation and testing may be performed with high speed digital circuits, such as superconducting logic, in a serial fashion, or slower logic with parallelization as necessary, though other technologies may be employed as appropriate and/or necessary, including but not limited to optical computers, programmable logic arrays, massively parallel computers (e.g., graphic processors, such as nVidia Tesla® GPU, ATI Radeon R66, R700), and the like. The use of superconducting digital circuits may be advantageous, for example, where a large number of complex computations which make significant use of a specialized high speed processor, such as where a large number of independent receivers are modeled as part of a transmitter optimization.

In the preferred embodiment, at any state of the tests over the parametric range, if the test is not passed, a control signal is fed back to the register, e.g., CSR, which rotates the data bits of the modified signal S2. The shifted data is then combined with the initial stored data from S1 as before, and the PAPR re-tested. This is repeated until the PAPR test is passed. A similar sequence of steps is illustrated in FIG. 10, where stripping off the preamble and reattaching it at the end are explicitly shown. It is noted that, in some cases, the tests may be applied in parallel, and therefore a strictly iterative test is not required. This, in turn, permits use of lower speed testing logic, albeit of higher complexity. Likewise, at each relative time-shift, a secondary parameter may also be considered.

For example, a secondary consideration for optimal combining may be in-band (non-filterable) intermodulation distortion. Thus, at each basic parametric variation, the predicted in-band intermodulation distortion, expressed, for example, as a power and/or inferred BER, may be calculated. This consideration may be merged with the PAPR, for example, by imposing a threshold or optimizing a simple linear combination "cost function", within an acceptable PAPR range.

While there may be some delays in this Shift-and-Add process (SAA), the time for the entire decision algorithm, including all iterations, must not exceed the expanded symbol time $T+\Delta T$. We have described a serial decision process in FIGS. 4 and 10. As discussed above, in some cases, it may be preferable to carry out parts of this process in parallel, using multiple CSRs with different shifts and multiple parallel PAPR tests, in order to complete the process more quickly. This is illustrated in FIG. 11, which suggests parallel memories (shown here as RAMs), each with an appropriate time shift, where the minimum PAPR is selected to send to the RF subsystem. The optimum tradeoff between circuit speed and complexity will determine the preferred configuration.

In some situations, the search for an optimum combined signal requires vast computational resources. In fact, heuristics may be available to limit the search while still achieving an acceptable result. In the case of a PAPR optimization, generally the goal is to test for limited, low probability "worst case" combinations of symbols. If the raw digital data is available, a lookup table may be employed to test for bad combinations, which can then be addressed according to a predetermined modification. However, for multi-way combinations of complex symbols this lookup table may be infeasible. On the other hand, the individual OFDM waveforms may each be searched for peaks, for example 6 dB above mean, and only these portions of the signal analyzed to determine whether there is a temporal alignment with the peaks of other OFDM signals; if the peaks are not temporally synchronized, then a presumption is made that an unacceptable peak will not result in the final combined signal. This method makes a presumption that should be statistically acceptable, that is, that only portions of an OFDM waveform that are themselves relative peaks will contribute to large peaks in the combination of OFDM signals. This method avoids serial testing of sequential parametric variations, and rather simply avoids worst case superpositions of a binary threshold condition.

Although these figures focus on the case of reducing PAPR for the combination of two OFDM channels, this method is not limited to two channels. Three or more channels can be optimized by a similar method of circular time shifts, followed by PAPR tests. Furthermore, although cyclic shifting is presented as a preferred embodiment of the proposed method, this is intended to represent a specific example of a more general signal transformation. Any such transformation that encodes the same information, and can be decoded (without error) by the receiver without the transmission of additional side information, would serve the same purpose. The identification of such transformations depends on the details of present and future protocols for wireless signal communication systems.

Finally, both the codebook LUT and the signal transformation may incorporate other digital methods to improve signal fidelity, such as predistortion (to compensate for power amplifier nonlinearity) and multi-antenna transmission (MIMO). In this way, the carrier aggregation method of the present invention can accommodate new approaches to increase data rate and decrease noise.

It is therefore an object to provide a method for controlling a combined waveform, representing a combination of at least one multiple subchannel multiplexed (MSM) signal with another signal, comprising: receiving information to be communicated from a transmitter to a receiver through the at least one MSM signal according to a predetermined protocol, the MSM signal comprising pilot signals, within at least one subchannel for at least a portion of time, having predefined characteristics sufficiently independent of the information to be communicated, to permit receiver prediction of a communication channel state with respect to varying communication channel conditions; storing a model of the receiver with respect to prior communications and a combination of the MSM signal with the other signal in a memory, the model being for predicting a receiver ability to demodulate the information and a receiver ability to predict the channel state, over a range of at least one parameter representing an alteration in the state of the combination; and defining, with an automated processor, the combination of the MSM signal with the other signal which is predicted to permit sufficient receiver estimation of the channel state to demodulate the information and which further meets at least one fitness criterion distinct from the receiver estimation of the channel state and being dependent on both MSM signal and the other signal, with respect to at least two different values for the at least one variable parameter.

It is also an object to provide a system for controlling a combined waveform, representing a combination of at least one multiple subchannel multiplexed (MSM) signal according to a predetermined protocol to be communicated from a transmitter to a receiver with another signal, the MSM signal comprising pilot signals, within at least one subchannel for at least a portion of time, having predefined characteristics sufficiently independent of the information to be communicated, to permit receiver prediction of a communication channel state with respect to varying communication channel conditions, comprising: a model of a receiver stored in a memory, dependent on prior communications and a combination of the MSM signal with the other signal in a memory, for predicting a receiver ability to demodulate information and a receiver ability to predict the channel state, over a range of at least one parameter representing an alteration in the state of the combination; and an automated processor configured to define the combination of the MSM signal with the other signal which is predicted to permit sufficient receiver estimation of the channel state to demodulate the information and which further meets at least one fitness criterion distinct from the receiver estimation of the channel state and being dependent on both MSM signal and the other signal, with respect to at least two different values for the at least one variable parameter.

It is a further object to provide a method for controlling a combined waveform, representing a combination of signals, the signals comprising at least one multiple subchannel multiplexed signal having information modulated in respective subchannels, with a modulated signal, comprising: receiving information to be communicated from a transmitter to a receiver through the at least one multiple subchannel multiplexed signal according to a predetermined protocol, the multiple subchannel multiplexed signal comprising pilot signals, within at least one subchannel for at least a portion of time, having predefined characteristics sufficiently independent of the information to be communicated, to permit receiver prediction of a communication channel state with respect to varying communication channel conditions; storing a model of the receiver with respect to a combination of the multiple subchannel multiplexed signal with the modulated signal in a memory, the model being for predicting a receiver ability to demodulate the information and a receiver ability to predict the channel state, over a range of at least one parameter representing available alterations in the state of the combination; and defining, with an automated processor, the combination signals which is predicted to permit sufficient receiver estimation of the channel state to demodulate the information from respective subchannels and which further meets at least one fitness criterion distinct from the receiver estimation of the channel state and being dependent on both the multiple subchannel multiplexed signal and the modulated signal, with respect to at least two different values for the at least one parameter.

It is another object to provide a system for controlling a combined waveform, representing a combination of signals, the signals comprising at least one multiple subchannel multiplexed signal having information modulated in respective subchannels, with a modulated signal, comprising: an input configured to receive information to be communicated from a transmitter to a receiver through the at least one multiple subchannel multiplexed signal according to a predetermined protocol, the multiple subchannel multiplexed signal comprising pilot signals, within at least one subchannel for at least a portion of time, having predefined characteristics sufficiently independent of the information to be communicated, to permit receiver prediction of a communication channel state with respect to varying communication channel conditions; a memory configured to store a model of the receiver with respect to an ability to estimate a channel state demodulate the information, from a combination of the multiple subchannel multiplexed signal with the modulated signal; at least one automated processor configured to: define a plurality of alternate representations of differing combinations of the multiple subchannel multiplexed signal with the modulated signal, differing with respect to at least one parameter, wherein the at least one parameter has a range which includes at least one value that impairs an ability to estimate a channel state by the receiver; and select at least one combination of the multiple subchannel multiplexed signal with the modulated signal which is predicted based on the model to permit sufficient receiver estimation of the channel state and to demodulate the information from respective subchannels with respect to the defined plurality of alternate representations of differing combinations.

It is still another object to provide a system for controlling a combined waveform, representing a combination of at least one multiple subchannel multiplexed signal according to a predetermined protocol to be communicated from a transmitter to a receiver with a modulated signal, the multiple subchannel multiplexed signal comprising pilot signals, within at least one subchannel for at least a portion of time, having predefined characteristics sufficiently independent of information to be communicated, to permit receiver prediction of a communication channel state with respect to varying communication channel conditions, comprising: a model of a receiver stored in a memory, dependent on a combination of the multiple subchannel multiplexed signal with the modulated signal in a memory, for predicting a receiver ability to demodulate information and a receiver ability to predict the channel state, over a range of at least one parameter representing an alteration in the state of the combination; and an automated processor configured to define the combination of the multiple subchannel multiplexed signal with the modulated signal which is predicted to permit sufficient receiver estimation of the channel state to demodulate the information and which further meets at least one fitness criterion distinct from the receiver estimation of the channel state and being dependent on both the multiple subchannel multiplexed signal and the modulated signal, with respect to at least two different values for the at least one parameter.

Another object provides an apparatus for combining a plurality of signals in a respective plurality of channels, each signal comprising a set of concurrent phase and/or amplitude modulated components within a channel, comprising: a processor configured to: receive information defining each of the plurality of signals; transform a representation of at least one signal in a plurality of different ways, each transformed representation representing the same information, analyze respective combinations of each transformed representation with information defining at least one other signal, with respect to at least two different fitness criteria, and select at least one respective combination as being fit according to the analysis with respect to the at least two different fitness criteria; and an output port configured to present at least one of an identification of the selected at least one respective combination, the selected at least one respective combination, and information defining the selected at least one respective combination, wherein at least one of the criteria relates to a predicted ability of a receiver to estimate a channel state of a communication channel, and wherein at least one transformed representation impairs an ability of the receiver to successfully estimate the channel state of the communication channel.

It is a still further object to provide an apparatus for combining a plurality of signals in a respective plurality of channels, each signal comprising a set of phase and/or amplitude modulated orthogonal frequency components within a channel, comprising: a processor configured to receive information defining each of the plurality of signals, being represented as a plurality of orthogonal frequency multiplexed signal components, transform a representation of at least one signal in at least two different ways, each transformed representation representing the same information, analyze with respect to at least two different fitness criteria a plurality of different combinations of the plurality of signals, each of the plurality of representations including alternate representations of at least one signal subject to at least two different transformations, and select a combination based on the analyzing which meets each of the at least two criteria; and an output port configured to present at least one of an identification of the selected combination, the selected combination, and information defining the selected combination, wherein at least one of the criteria relates to a predicted ability of a receiver to estimate a channel state of a communication channel based on pilot sequences within the representation, wherein at least one transformation of the representation impedes an ability of the receiver to successfully estimate the channel state for demodulating the information.

It is also an object to provide an apparatus for controlling a combined waveform, representing a combination of at least two signals, each having a plurality of signal components and conveying information, comprising: an input port configured to receive information defining the at least two signals; an automated processor configured to: transform a first of the signals into at least two representations of the conveyed information within a range of transformations, along with pilot signal information which varies in frequency and which is selectively communicated over time, to permit a receiver to estimate a channel state, having prohibited combinations of transformation parameters and pilot signal information, combine a transformed representation of a first of the signals with a second of the signals, to define at least two alternate combinations representing the conveyed information, and select one combination which meets a predetermined criterion and which permits the receiver to at least estimate the channel state; and an output port configured to output information representing a respective combined waveform comprising the selected one combination of the transformed representation which meets the predetermined criterion.

A plurality of sets of combined waveforms may be formed, each combined waveform representing a respective combination of the multiple subchannel multiplexed signal with the modulated signal at a respective value of the at least one parameter, and said defining comprises selecting a respective defined waveform which meets the at least one fitness criterion. The modulated signal is typically modulated with second information (which may be intelligence or a pseudorandom noise sequence), and the automated processor may further define the combination of the multiple subchannel multiplexed signal with the modulated signal in a manner which is predicted to permit demodulation of the second information from the modulated signal.

The MSM signal may be, for example, an orthogonal frequency multiplexed signal, but is not so limited. In particular, the subcarriers need not be orthogonal, and indeed, the subcarriers need not be distributed according to frequency, though such an arrangement is presently preferred, especially to the extent that the receivers are standard OFDM receivers. The MSM signal may also be a wavelet encoded signal, in which case the discrete wavelet transform (DWT) and corresponding inverse wavelet transform (IWT) generally replace the FFT and IFT employed within OFDM communications. An orthogonality constraint may be relaxed such that the receiver in the estimated state can demodulate the information, without strictly meeting the constraint.

In general, MSM signals are intended to be communicated to, and received by, mobile receivers, and therefore the communication protocol provides tolerance to various types of interference and distortion. For example, time varying multipath, Doppler shifts, and the like, are tolerable. The present technology can model the receiver with respect to the tolerance, for example by calculating a bit error rate, or data throughput rate (dependent on retransmission of packets and error detection and correction (EDC) code burden), and optimizing the combined signal.

The plurality of signals may each comprise orthogonal frequency division multiplexed signals. A first combination and a second combination based on different values of the variable parameter may differ with respect to at least one of (a) a relative timing of a modulation of the frequency components of a first signal with respect to a second signal and (b) a relative phase of the frequency components of the first signal with respect to the second signal. The at least one criterion may comprise a peak to average power ratio (PAPR). The selected at least one respective combination may comprise a combination that is beneath a threshold peak to average power ratio.

The at least one fitness criterion may comprise a peak to average power ratio (PAPR).

The signals may comprise orthogonal frequency division multiplexed (OFDM) signals. At least one signal may be an orthogonal frequency division multiplexed stream which is compatible with at least one protocol selected from the group of an IEEE 802.11 protocol, an IEEE 802.16 protocol, a 3GPP-LTE downlink protocol, LTE-Advanced protocol, a DAB protocol and a DVB protocol, wherein a receiver compliant with the at least one protocol can demodulate the at least two respectively different combinations of without requiring additional information to be transmitted outside of the protocol.

The at least two different values of the variable parameter may correspond to signals that differ respectively in a cyclic time shift in a modulation sequence.

The at least two different values of the variable parameter may correspond to signals that differ respectively in a cyclic time shift in a modulation sequence, and the at least one fitness criterion may comprises a peak to average power ratio (PAPR). An alternate representation which results in a lowest peak to average power ratio, or a peak to average power ratio below a threshold, may be selected for combination.

At least one of an intermediate frequency at a frequency below about 125 MHz and a radio frequency representation at a frequency greater than about 500 MHz of the defined combination of signals may be predistorted.

The automated processor may comprise superconducting digital logic circuits. Alternately, the automated processor may comprise a programmable logic device, programmable logic array, CPLD, RISC processor, CISC processor, SIMD processor, general purpose graphics processing unit (GPGPU) or the like, implemented in silicon technology, superconducting digital logic circuits, or other types of logic.

Meeting the fitness criterion may comprise analyzing with respect to dynamic range of a respective combination, or analyzing with respect to a predicted error rate of a reference receiver design for one of the signals, or analyzing with respect to a peak to average power ratio of the combined waveform and a predicted error rate of a receiver for one of the signals, or analyzing a clipping distortion of the combined waveform, for example.

The combined waveform may be a digital representation that is sampled at a data rate higher than the corresponding data rates of any of the component signals or a digital representation of an intermediate frequency representation of the combined signal, for example.

Generating the combined waveform may comprise outputting a set of parameters for converting a digital baseband signal into the selected combined signal.

The method may further comprise predistorting at least one of an intermediate frequency and a radio frequency representation of the selected combined signal. The predistorting may compensate for at least a portion of one or more of an analog non-linearity, a transmission channel impairment, and a receiver characteristic of an analog radio communication system communicating using the selected combined signal. The predistorting may also compensate for a non-linear distortion of a power amplifier which amplifies the selected combined signal.

Each of the at least two signals may comprise an orthogonal frequency domain multiplexed signal having a cyclic prefix, and wherein the two alternate representations differ in a respective cyclic time shift.

Each of the at least two signals may be received as an orthogonal frequency division multiplexed signal conforming to a communications protocol, at least one of the signals may be modified to generate the at least two alternate representations, and the at least one fitness criterion may comprise a peak to average power ratio of the combined signal, wherein the selected combined signal is a combined signal representing a lowest peak to average power ratio or a peak to average power ratio below a predetermined threshold.

The receiver model may incorporate prior pilot signals in defining acceptable values of the variable parameter that are selected for further evaluation according to the fitness criterion.

The selection of acceptable values of the variable parameter may be implemented with the use of an adaptive lookup table memory. The automated processor may be configured to retrieve values from the lookup table for the selection of the at least one combination.

The receiver model may extrapolate prior pilot signals to generate a reference signal during time periods when a current pilot signal is not available.

A buffer memory may be used to store the input signals until the preferred combination for transmission is defined. The buffer memory may comprise at least one shift register.

The evaluation of the fitness criterion for the combination may be implemented in parallel for the different values of the variable parameter.

The automated processor may comprise a programmable gate array.

Each of the at least two signals may be received as an orthogonal frequency division multiplexed signal conforming to a communications protocol, at least one of the signals may be modified to generate the at least two alternate representations, each of which can be demodulated by a receiver compatible with the protocol without requiring receipt of additional information outside of the communications protocol, and the at least one criterion may comprise a peak to average power ratio of the combined signal. The at least one criterion may comprise a peak to average power ratio of the combined signal. The selected combined signal may be a combined signal representing a lowest peak to average power ratio, or a peak to average power ratio within a threshold level.

The MSM signal may be an orthogonal frequency multiplexed (OFDM) signal having a plurality of subcarriers at different frequencies which concurrently communicate the information. The MSM signal and the other signal may each be within a different communication channel and be processed as a combined analog signal in at least one analog signal processing component having a non-linear distortion. The MSM signal may comply with a predetermined protocol which selectively inserts the pilot signals in a plurality of the subcarriers at different times and at different frequencies, to estimate the channel state. The at least one parameter may comprise a cyclic shift of digital data representing the MSM signal, wherein the model predicts an ability of a receiver which complies with an OFDM protocol to detect the pilot and estimate the channel state subject to at least two different cyclic shifts. The at least one fitness criterion may be dependent on the non-linear distortion of the combination of the MSM signal with the other signal in the analog signal processing component.

It is a further object to provide an apparatus for controlling a combined waveform, representing a combination of at least two signals having a plurality of signal components, comprising: an input port configured to receive information defining the at least two signals; a processor configured to: transform the information defining each signal into a representation having a plurality of components, such that at least one signal has alternate representations of the same information along with further information to permit a receiver to estimate a channel state, and combining the transformed information using the alternate representations, to define at least one combination which meets a predetermined criterion and which permits the receiver to estimate the channel state, wherein the transform is adapted to define at least one alternate representation which fails to permit the receiver to estimate the channel state; and an output port configured to output information representing a respective combined waveform comprising the combination of the transformed information from each of the at least two signals which meets the criterion.

Thus, the transmitter may combine signals in such a way that the combination may violate a first criterion, but that the same information may be combined by altering the combination without violating the first criterion. However, the altered combination may violate a second criterion, that the un-altered combination generally does not violate. The processor seeks to find an alteration, which may require a search through a range, which meets both the first criterion and the second criterion. The second criterion relates to a communication from the transmitter to the receiver of pilot information which calibrates the receiver and for example permits the receiver to estimate the channel state. The pilot signals may be sparsely inserted into the combined signal, and the receiver may estimate the channel state based on a series of communicated pilot signals over a series of data frames.

A first combination and a second combination of the transformed information may differ with respect to at least one of (a) a relative timing of a modulation of the frequency components of a first signal with respect to a second signal and (b) a relative phase of the frequency components of a signal, and the at least one criterion may comprise a peak to average power ratio (PAPR). At least one signal may be an orthogonal frequency division multiplexed stream which is compatible with at least one protocol selected from the group of an IEEE 802.11 protocol, an IEEE 802.16 protocol, a 3GPP-LTE downlink protocol, a DAB protocol and a DVB protocol, wherein a receiver compliant with the at least one protocol can demodulate the at least two respectively different combinations without requiring additional information to be transmitted outside of the protocol. Each transformed representation may differ respectively in a cyclic time shift in a modulation sequence. The at least two criteria comprise a peak to average power ratio (PAPR), wherein an alternate representation which results in a peak to average power ratio within a threshold maximum peak to average power ratio is selected for combination.

The at least two alternate representations may differ respectively in a cyclic time shift in a modulation sequence, and the at least one criterion may comprise a peak to average power ratio (PAPR), wherein an alternate representation which results in a lowest peak to average power ratio is selected for combination.

The processor may comprise at least one of superconducting digital circuit logic and a complex programmable logic device (CPLD).

The output port may be configured to output the selected combined signal as a direct conversion from a digital representation of the combined signal to a radio frequency analog signal adapted for transmission without frequency modification.

The processor may be further configured to predistort at least one of an intermediate frequency and a radio frequency representation of the selected combined signal.

The predistortion may compensate for at least a portion of one or more of an analog non-linearity, a transmission channel impairment, and a receiver characteristic of an analog radio communication system communicating using the selected combined signal.

The signals may comprise orthogonal frequency division multiplexed signals. A first combination and a second combination of the transformed information may differ with respect to at least one of (a) a relative timing of a modulation of the frequency components of a first signal with respect to a second signal and (b) a relative phase of the frequency components of a signal. The at least one criterion may comprise a peak to average power ratio (PAPR). The selected combination may comprise a combination with a lowest peak to average power ratio.

Each transformed representation may differ respectively in a cyclic time shift in a modulation sequence, and wherein the orthogonal frequency division multiplexed signals are compatible with at least one protocol selected from the group of an IEEE 802.11 protocol, an IEEE 802.16 protocol, a 3GPP-LTE downlink protocol, a DAB protocol and a DVB protocol, wherein a receiver compliant with the at least one protocol can demodulate the at least two respectively different combinations of without requiring additional information to be transmitted outside of the protocol, each transformed representation differing respectively in a cyclic time shift in a modulation sequence, and the at least one criterion may comprise a peak to average power ratio (PAPR), wherein an alternate representation which results in a lowest peak to average power ratio is selected for combination. The processor may comprise at least one of superconducting digital circuit logic and a complex programmable logic device (CPLD). The processor may analyze a nonlinear distortion of the combined waveform in a model of an amplifier, and further predistort at least of at least one component of the selected combination and the selected combination.

Further objects will become apparent through a review of the detailed description and figures.

BRIEF DESCRIPTION OF THE DRAWINGS

FIG. 2 represents a time-frequency resource grid for an OFDM channel, showing typical locations of pilot symbols according to the protocol for LTE.

FIG. 12A shows a typical 64QAM constellation diagram for a simulated OFDM received signal without added noise.

FIG. 12B shows a 64QAM constellation diagram for a simulated OFDM received signal with noise added.

DETAILED DESCRIPTION OF THE PREFERRED EMBODIMENTS

Figure 1A:
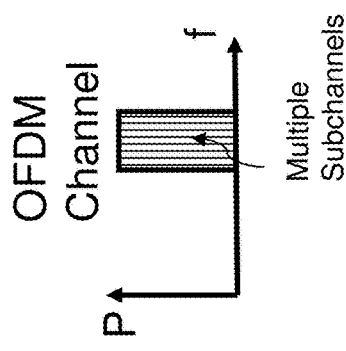
FIGS. 1A and 1B show typical behavior of an orthogonal frequency-domain multiplexed channel in the frequency and time domains, respectively.
Figure 1B:
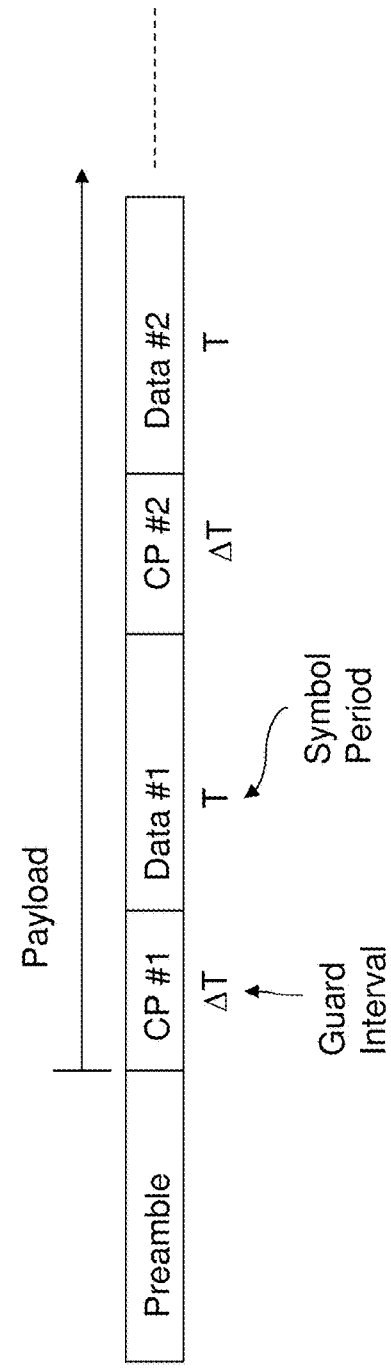

OFDM channels are comprised of many sub-channels, each of which is a narrow-band signal (FIG. 1A). An OFDM channel itself has a time-varying envelope, and may exhibit a substantial PAPR, typically 9-10 dB. However, if two separate similar OFDM channels are combined, the resulting signal will typically exhibit PAPR of 12-13 dB, for a gain of 3 dB. This is unacceptably large, since it would require a power amplifier with 4 times the capacity to transmit a combined signal that averages only 2 times larger.

A preferred embodiment therefore provides a PAPR reduction method which reduces the PAPR of a two OFDM channel combined signal from 12-13 dB back down to the 9-10 dB of the original components. This ~3 dB reduction in PAPR is preferably accomplished without degradation of the signal, and without the need to transmit any special side information that the receiver would need to recover the OFDM symbols. Further, the algorithm is simple enough that it can be implemented in any hardware technology, as long as it is sufficiently fast.

Conventional methods of PAPR reduction focus on combining the sub-channels and generating a single OFDM channel without excessive PAPR. The present technique can be viewed in certain respects as a combination of Partial Transmit Sequence (PTM) and Selected Mapping (SLM).

In traditional PTS, an input data block of N symbols is partitioned into disjoint sub-blocks. The sub-carriers in each sub-block are weighted by a phase factor for that sub-block. The phase factors are selected such that the PAPR of the combined signal is minimized.

In the SLM technique, the transmitter generates a set of sufficiently different candidate data blocks, all representing the same information as the original data block, and selects the most favorable for transmission (lowest PAPR without signal degradation).

The present hybrid approach combines elements of PTS and SLM for summed carrier modulated signals. The various cyclic time-shifts of the oversampled OFDM waveform are searched, and the time-shift with the lowest PAPR selected. One OFDM signal is used as reference and the other carrier modulated signal(s) are used to generate the time-shifts, in a manner similar to PTS. The search window is determined by the cyclic prefix length and the oversampling rate.

While the phase space of possible combinations of shifts increases tremendously, it would not be necessary to explore all such combinations. In general, very high values of the PAPR occur relatively rarely, so that most time shifts starting with a high-PAPR state would tend to result in a reduction in PAPR. Shifts in multiple channels could be implemented sequentially or in parallel, or in some combination of the two. Thus, for example, any combination with a PAPR within an acceptable range is acceptable, any unacceptable PAPR states occur 1% of the time, the search space to find an acceptable PAPR would generally be <2% of the possible states. On the other hand, if other acceptability criteria are employed, a larger search space may be necessary or appropriate. For example, assuming that there is a higher cost for transmitting a higher PAPR signal, e.g., a power cost or an interference cost, then a formal optimization may be appropriate. Assuming that no heuristic is available for predicting an optimal state, a full search of the parametric space may then be appropriate to minimize the cost.

This differs from conventional approaches, wherein different OFDM channels are independent of one another, with separate transmit chains and without mutual synchronization. Further, the conventional approaches operate directly on the baseband signals. In contrast, the present method evaluates PAPR on an up-converted, combined signal that incorporates two or more OFDM channels, and the symbol periods for each of these channels must be synchronized. This will not cause problems at the receivers, where each channel is received and clocked independently.

Some conventional approaches to PAPR are based on clipping, but these inevitably produce distortion and out-of-band generation. Some other approaches avoid distortion, but require special transformations that must be decoded at the receive end. These either require sending side-information, or involve deviations from the standard OFDM communication protocols. The present preferred approach has neither shortcoming.

OFDM channels used in cellular communications, may be up to 10 or 20 MHz in bandwidth. However, these channels might be located in a much broader frequency band, such as 2.5-2.7 GHz. So one might have a combination of two or more OFDM channels, each 10 MHz wide, separated by 100 MHz or more. A 10 MHz digital baseband signal may be sampled at a rate as low as 20 MS/s, but a combined digital signal covering 100 MHz must be sampled at a rate of at least 200 MS/s.

Figure 3:
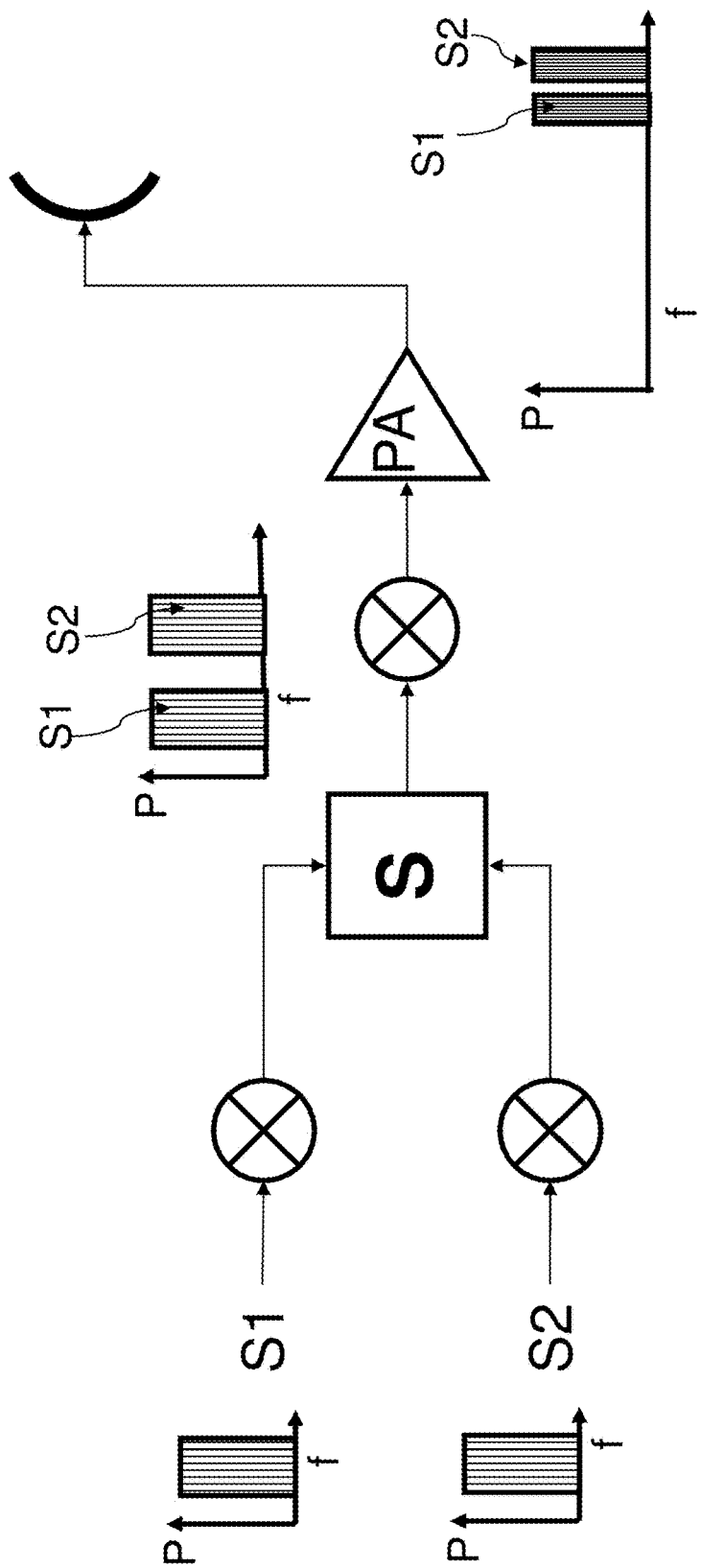
FIG. 3 shows the combination of two OFDM channels in a transmitter using a double-upconversion method.
Figure 4:
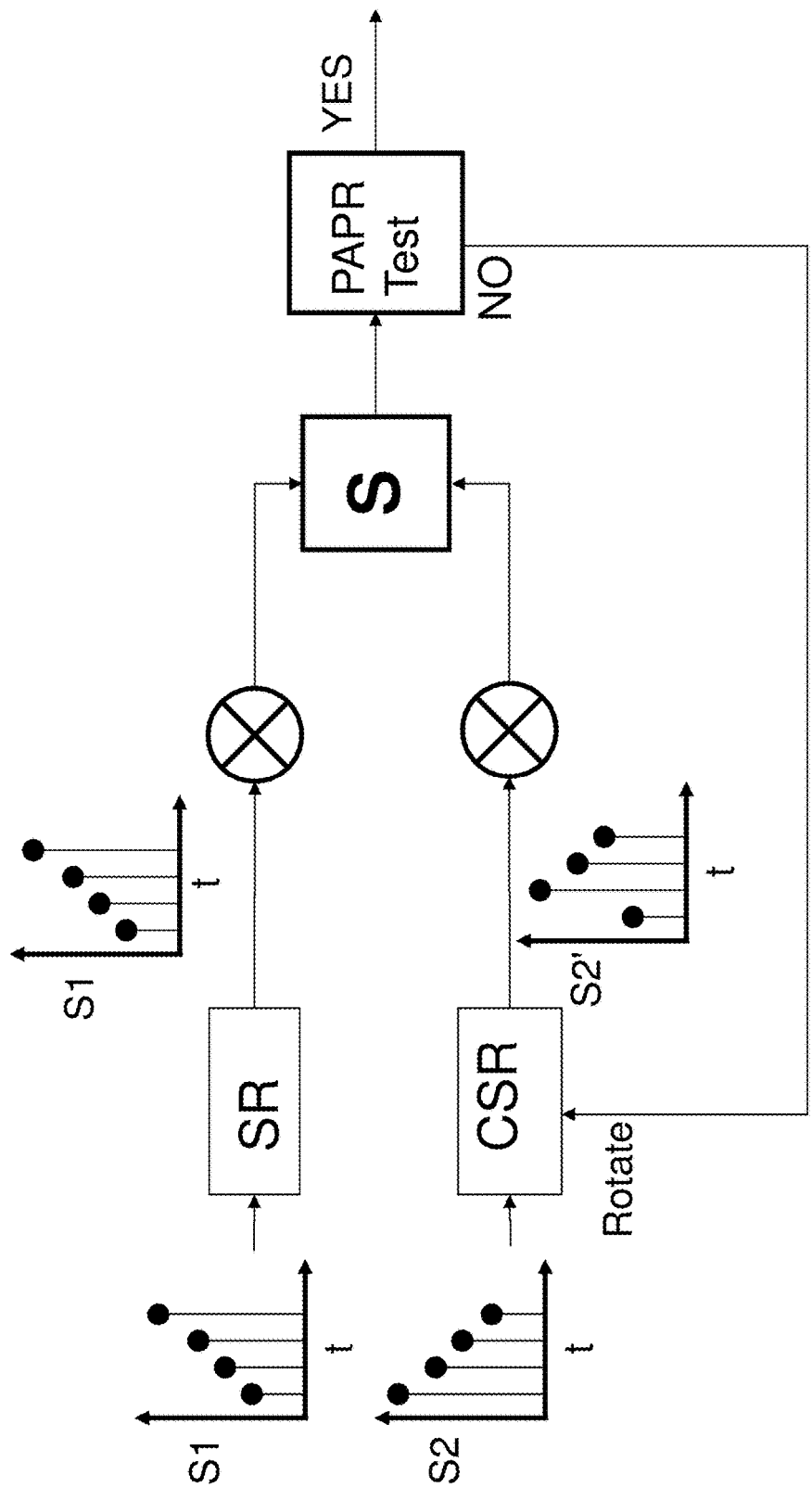
FIG. 4 provides a simple block diagram showing how two OFDM channels may be combined, wherein the data bits of one OFDM channel may be cyclically shifted in order to reduce the peak-to-average power ratio (PAPR).
Figure 5:
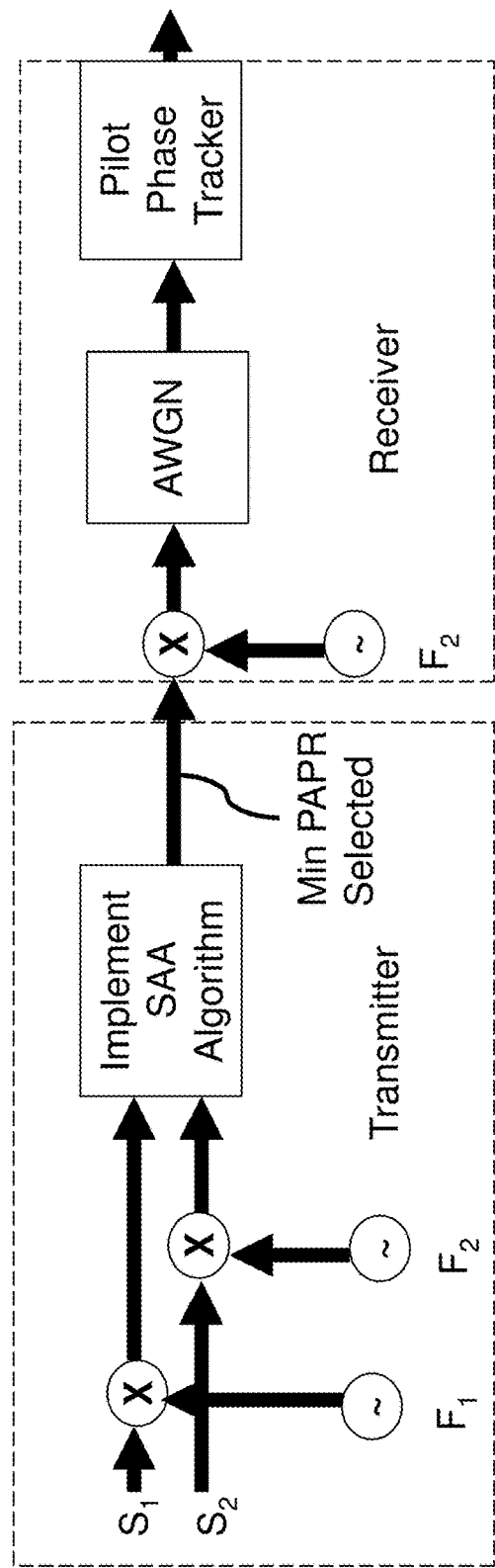
FIG. 5 shows a block diagram of an OFDM communication system that incorporates the shift-and-add algorithm in the transmitter and a pilot phase tracker in the receiver.

In a preferred embodiment, the signal combination (including the up-conversion in FIG. 3) is carried out in the digital domain at such enhanced sampling rate. The PAPR threshold test and CSR control are also implemented at the higher rate. This rate should be fast enough so that multiple iterations can be carried out within a single symbol time (several microseconds).

Figure 6:
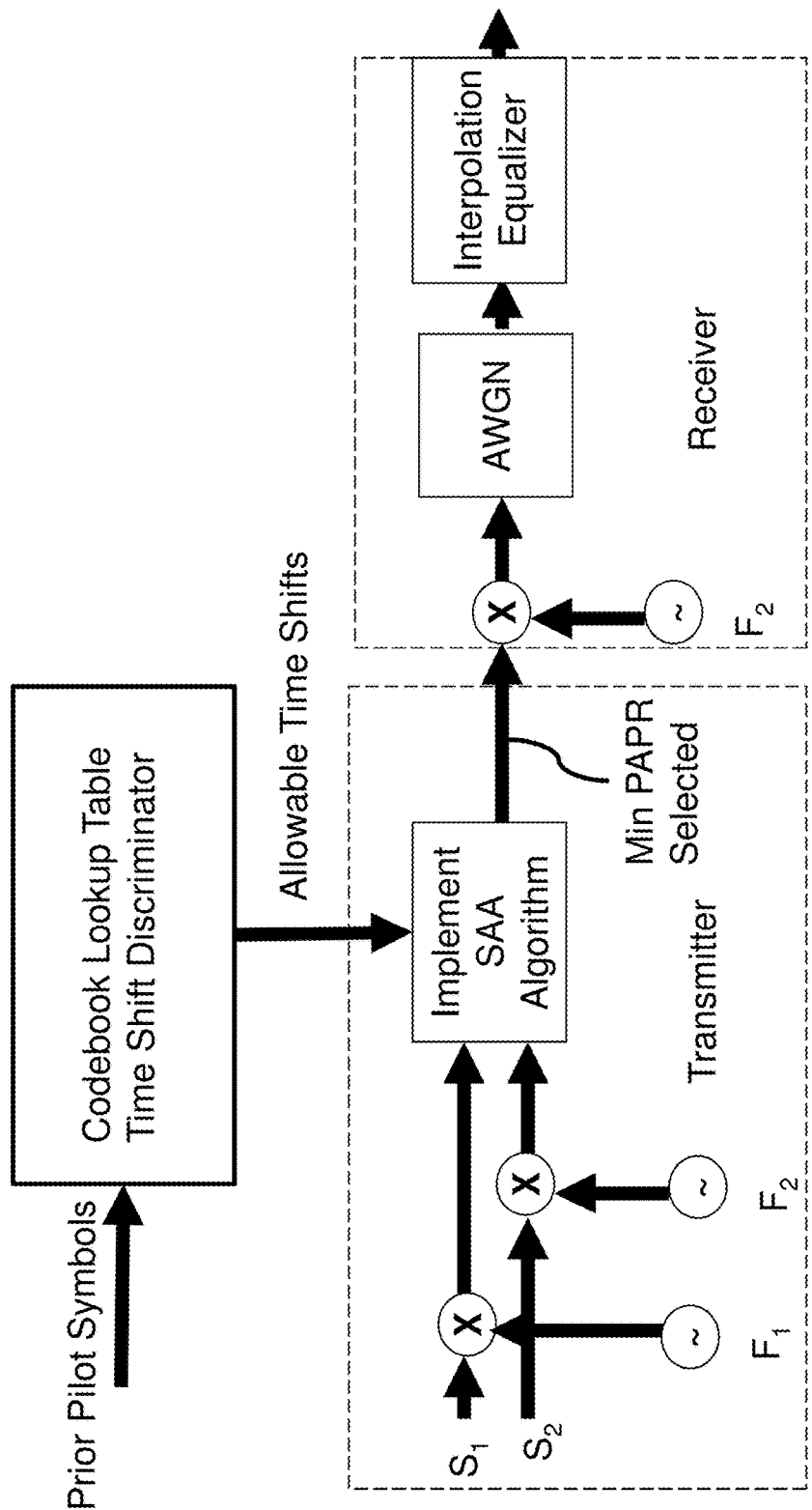
FIG. 6 shows a block diagram of an OFDM communication system that enables the SAA algorithm for a resource grid as in FIG. 2.
Figure 7:
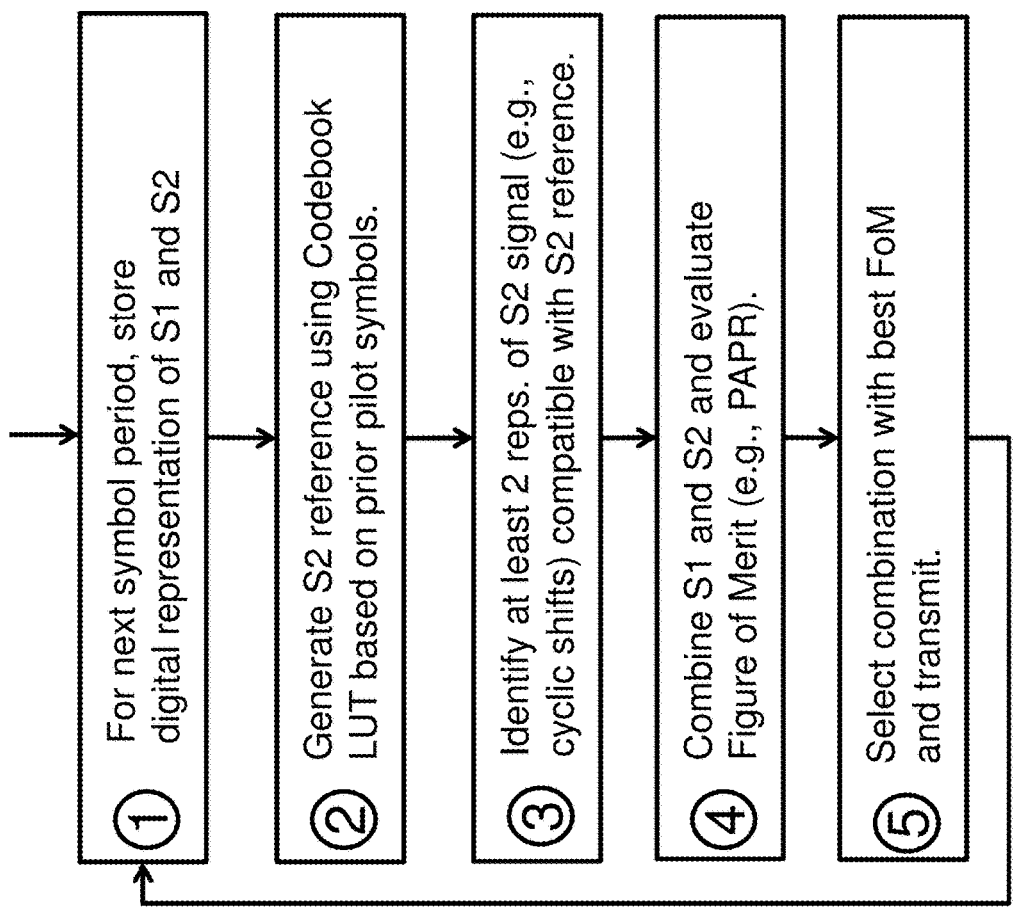
FIG. 7 shows a top-level flowchart for a generalized carrier aggregation method of the present invention.
Figure 8:
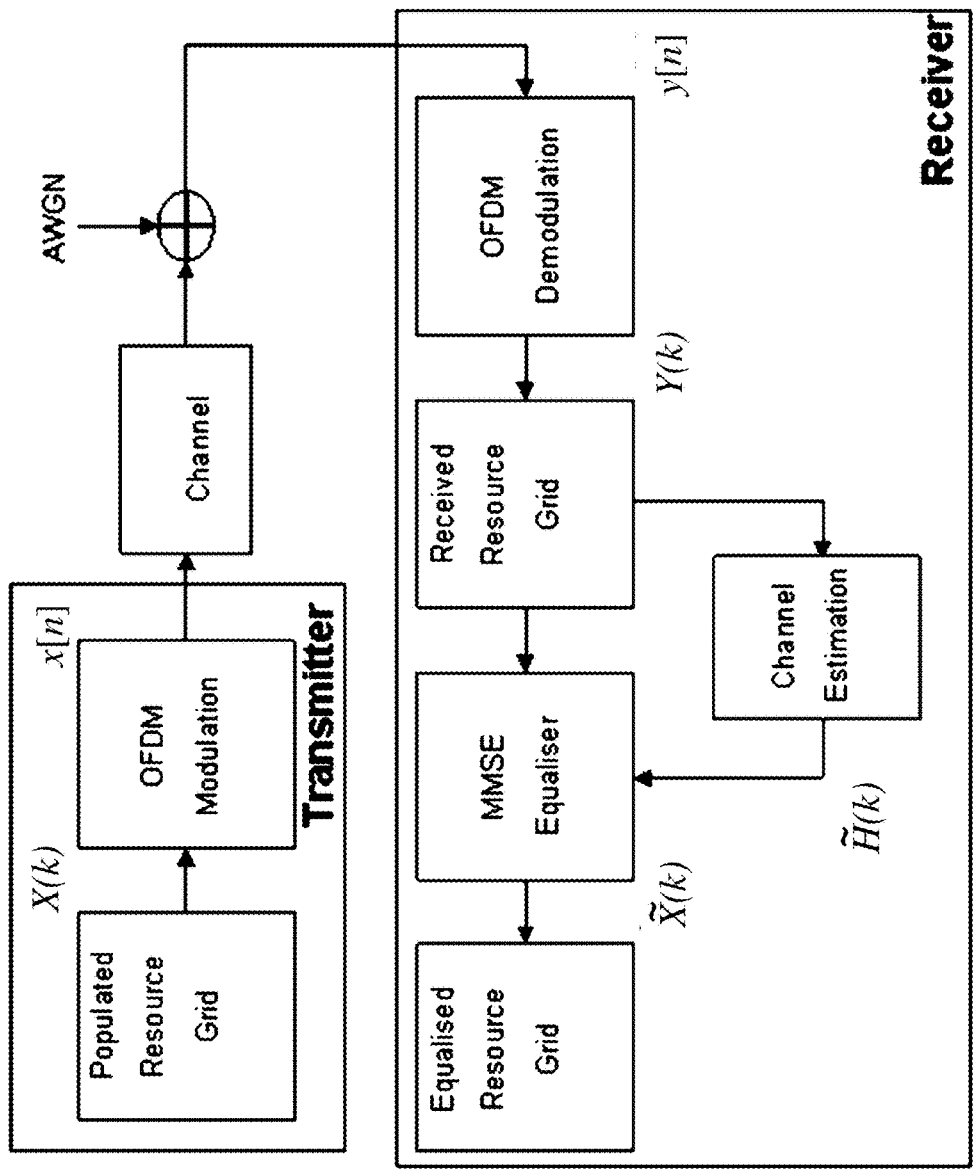
FIG. 8 shows a block diagram of an OFDM communication system, whereby the receiver generates an equalized resource grid based on an array of pilot symbols as in FIG. 2.
Figure 9:
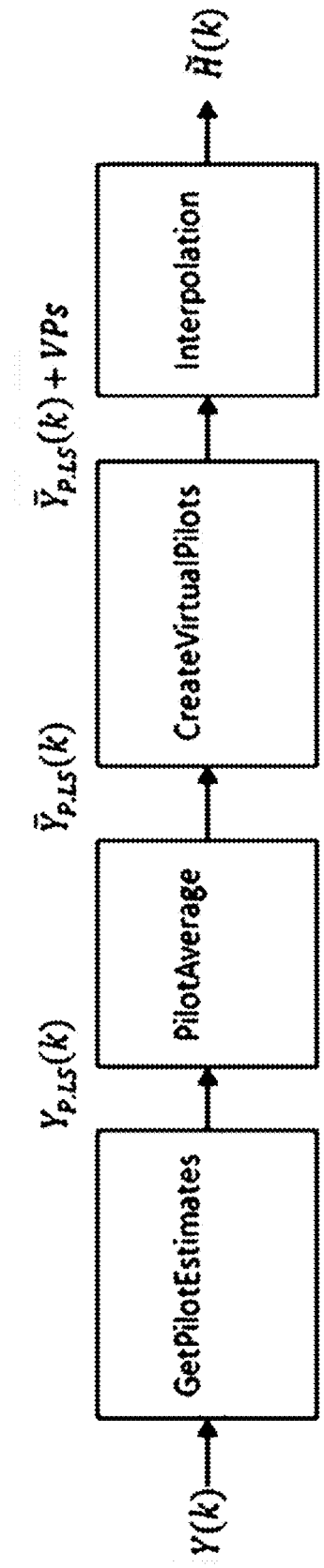
FIG. 9 shows a block diagram that represents the process of equalizing the resource grid at the receiver using an array of pilot symbols as in FIG. 2.
Figure 10:
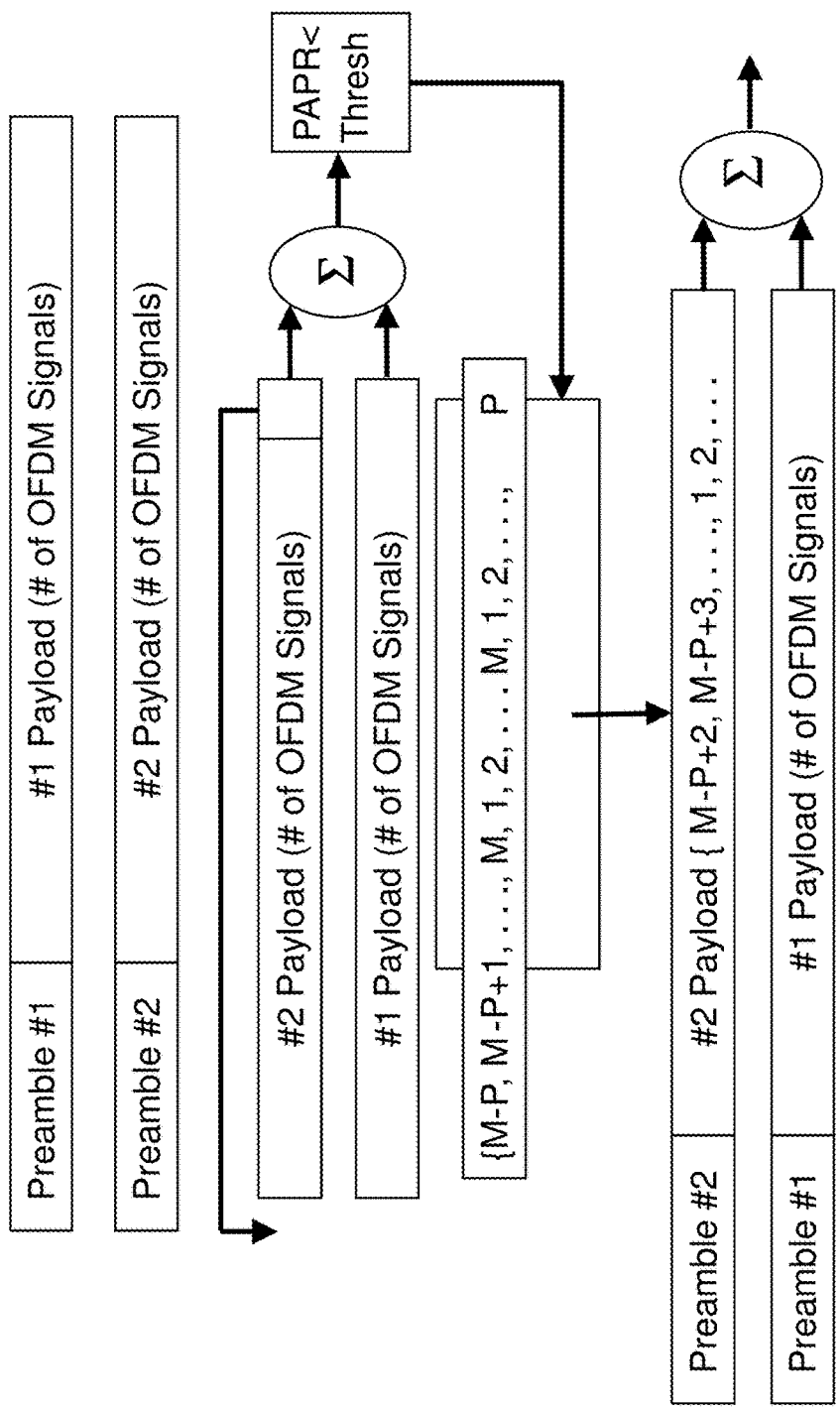
FIG. 10 shows the structure of two OFDM channels, with cyclic shifting of the data for one channel in order to reduce the PAPR of the combined signal.
Figure 11:
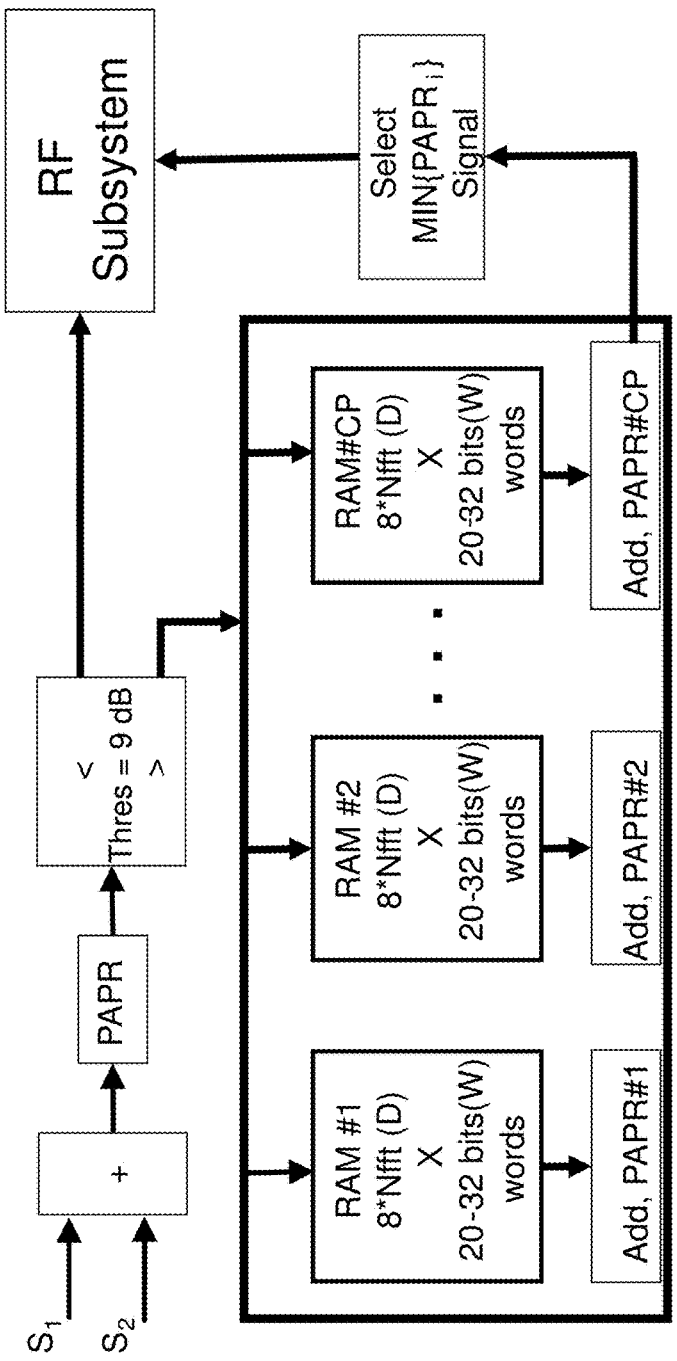
FIG. 11 provides a block diagram showing memory storage of multiple shifted replicas of data from an OFDM channel, with selection of one replica corresponding to minimizing the PAPR of the combined signal.

In order to verify the expectation that the circular time-shift permits reduction in PAPR for combined OFDM channels, without degrading system performance, a full Monte-Carlo simulation of OFDM transmission and reception was carried out. The block diagram of this simulation is summarized in FIG. 6, which represents the "Carrier Aggregation Evaluation Test Bench", and shows a transmitter that combines OFDM signals at frequencies $F_1$ and $F_2$, subject to the SAA algorithm for PAPR reduction. At the receive end, this is down-converted and the signal at $F_2$ is recovered using a standard OFDM receiver. Along the way, appropriate Additive White Gaussian Noise (AWGN) is added to the channel. The parameters for the Carrier Aggregation simulations include the following. Each packet contains 800 bytes of information, which is modulated over several OFDM symbol periods, and the modulation is 64-QAM (64-quadrature amplitude modulation). Each SNR point is run until 250 packet errors occur. The cyclic prefix is set to ⅛ of the total symbol time. Carriers at frequencies $F_1$ and $F_2$ are spaced sufficiently that their spectra do not overlap. The oversampling rate is a factor of 8. Finally, a raised cosine filter was used, with a very sharp rolloff, with a sampling frequency $F_s$=160 MHz, and a frequency cutoff $F_c$=24 MHz. FIG. 12A shows an example of a constellation chart of the 64-QAM received signals for the simulation without noise, where a time shift has been applied that is expected to be compatible with the interpolation equalizer of the receiver. In this example, no pilot symbol was transmitted during this time period. The clustering indicates that each bit is received within its required window, with no evidence of bit errors. More generally, no degradation of the signal was observed for an allowable time shift, as expected. FIG. 12B shows a similar 64-QAM constellation chart for the simulation with added Gaussian noise typical of a practical wireless communication system. Again, the simulation shows proper reception of the signal with no significant increase in bit errors.

Figure 13A:
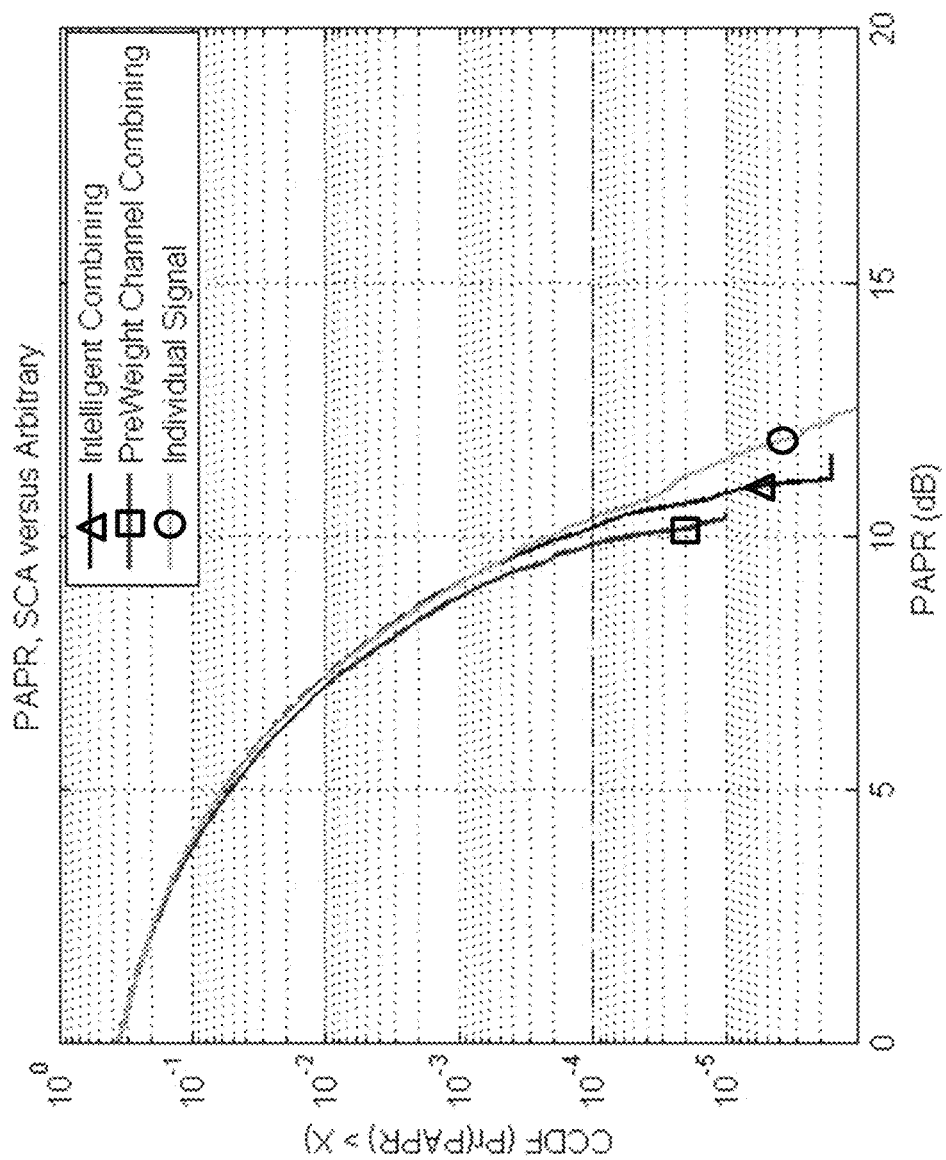
FIG. 13A shows a probability plot for PAPR of the carrier aggregation of simulated OFDM signals, showing reduced PAPR for the method of the invention.

FIG. 13A shows the simulated PAPR distribution for a combination of two OFDM signals, combined according to an embodiment of the invention. The Complementary Cumulative Distribution Function (CCDF) represents the probability that the signal has a PAPR greater than a given value. For practical purposes, a CCDF of $10^{-4}$ can be used to define the effective PAPR of a particular waveform. Each of the two component signals has a PAPR of 11 dB (top curve). The combination of the two signals without modification would lead to an increase in PAPR of almost 3 dB (not shown). In contrast, combination using the Codebook Pre-Weighting algorithm of the present invention leads to a decrease of almost 2 dB to about 9 dB (bottom curve). This benefit would be reduced if this Codebook approach is not applied (middle curve).

Figure 13B:
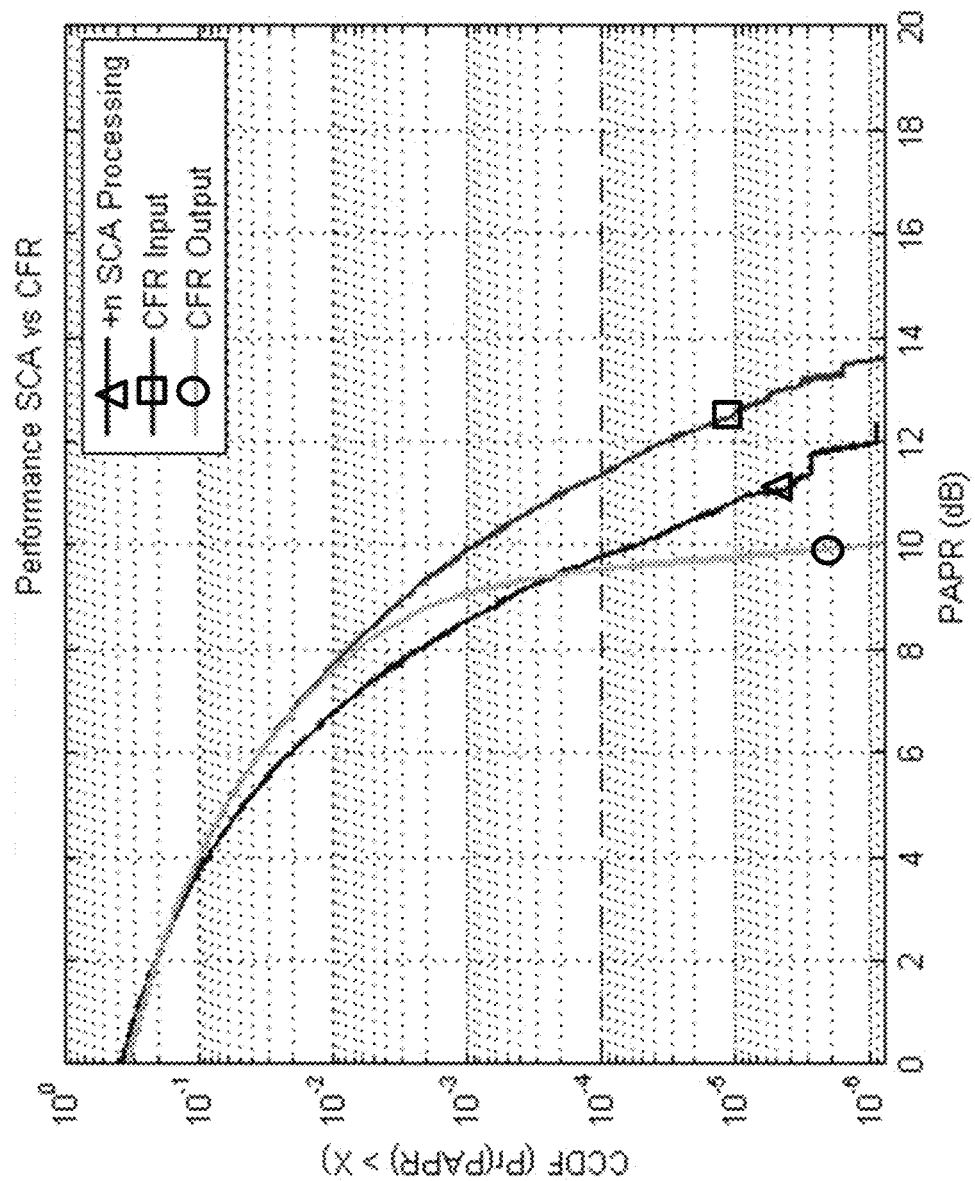
FIG. 13B shows a probability plot for PAPR of the carrier aggregation of simulated OFDM signals, including the effect of digital predistortion.
Figure 13C:
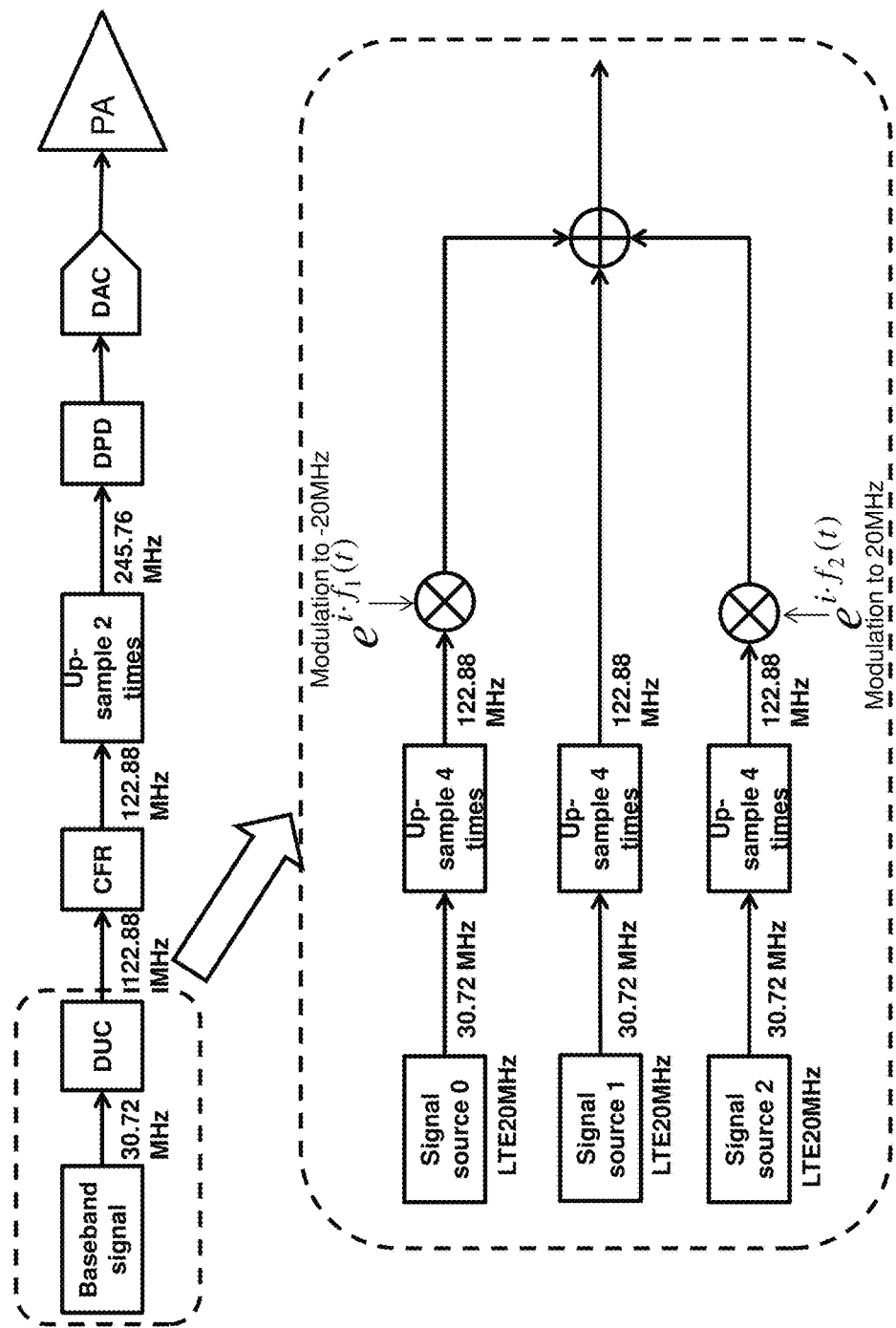
FIG. 13C shows a block diagram of the simulation with results shown in FIGS. 13A and 13B.

FIG. 13B shows the effect of applying digital predistortion (DPD) in addition to Crest Factor Reduction (CFR), as indicated in the simulation block diagram of FIG. 13C. FIG. 13C shows the combination of three OFDM signals, each corresponding to LTE signals of 20 MHz bandwidth. The individual baseband signals are sampled at 30.72 MHz, followed by upsampling to 122.8 MHz, offsetting the frequencies (using a digital multiplier), and adding together to form an IF signal with a 60 MHz band comprising three 20 MHz bands. This is then subject to Crest Factor Reduction (CFR) according to the Codebook Weighting algorithm of the present invention, followed by upsampling (by a factor of two) and digital predistortion (DPD, to simulate the saturation effect of a nonlinear power amplifier PA). Finally, the predistorted signal is sent to a digital-to-analog converter (DAC) and then amplified in the PA. The curve in FIG. 13B labeled CFR Input shows the combined signal, while CFR Output shows the result of PAPR reduction. The curve labeled "+n SCA Processing" (PlusN Smart Carrier Aggregation) corresponds to the signal as broadcast, including the effects of predistortion.

These simulations have confirmed not only that the SAA algorithm permits reduction of PAPR in combined OFDM channels by ~3 dB, but also that this reduction is achieved without signal degradation and without the need to send any special side information on the transformations in the transmit signal. This can also be integrated with digital predistortion, without degradation of the PAPR reduction.

Figure 14:
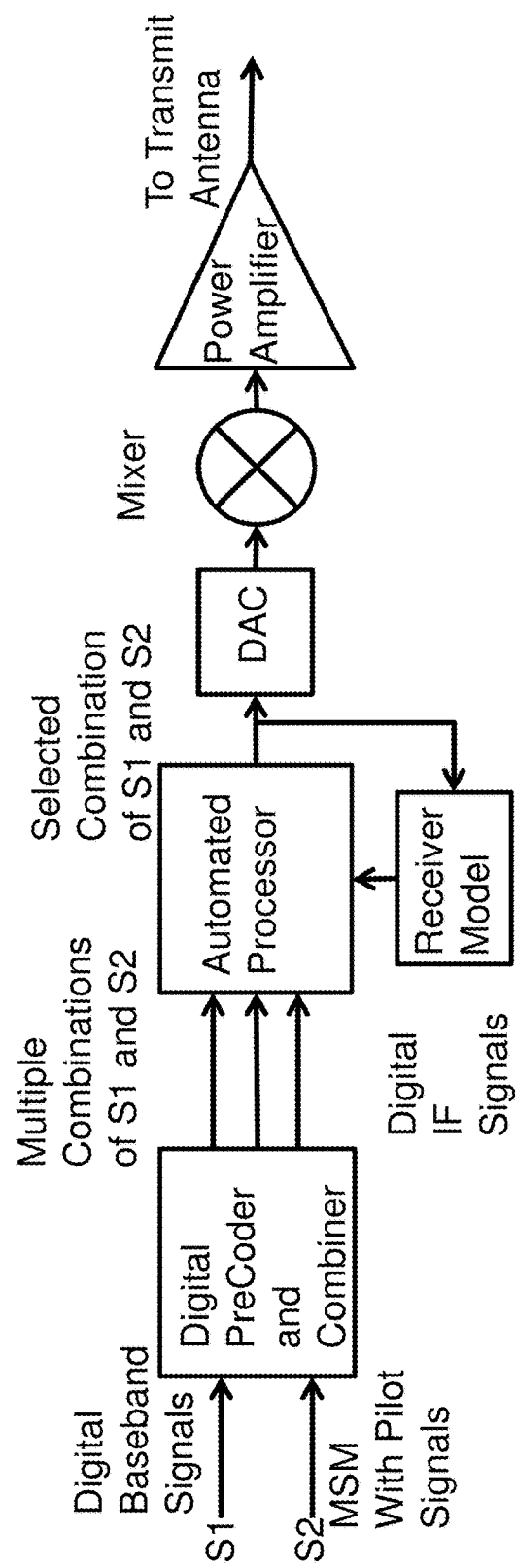
FIG. 14 shows a block diagram of a system according to one embodiment of the invention.

A block diagram of a system according to one embodiment of the invention is shown in FIG. 14, where at least one of the input signals is identified as a multiple subchannel multiplexed (MSM) signal, essentially a generalization of an OFDM signal. The MSM signal is assumed to include pilot signals independent of the information content, which enable the signal to be properly received in the presence of multi-path, Doppler shift, and noise. Here the MSM signal and another signal are combined in a plurality of alternative aggregated signals, where each such alternative combination could be properly received for both such signals at a receiver, without sending additional side-information. A digital model of the receiver, which may incorporate prior transmitted signals, permits determination of which alternative combinations correspond to MSM pilot signals that can be properly tracked at the receiver. Based on this criterion, and at least one other criterion that may be associated with combined signal amplitude (such as peak-to-average-power ratio or PAPR), one or more of the alternative combinations is selected, which may be subject to further processing or selection, e.g., in an iterative selection process using various criteria, for transmission using an automated processor. This may preferably be carried out using a digital IF signal, which is then converted to an analog signal in a digital-to-analog converter (DAC), and then upconverted to the full radio frequency signal in the standard way in an analog mixer before being amplified in the Power Amplifier and transmitted via an antenna. Other types of RF modulators may also be employed.

Figure 15:
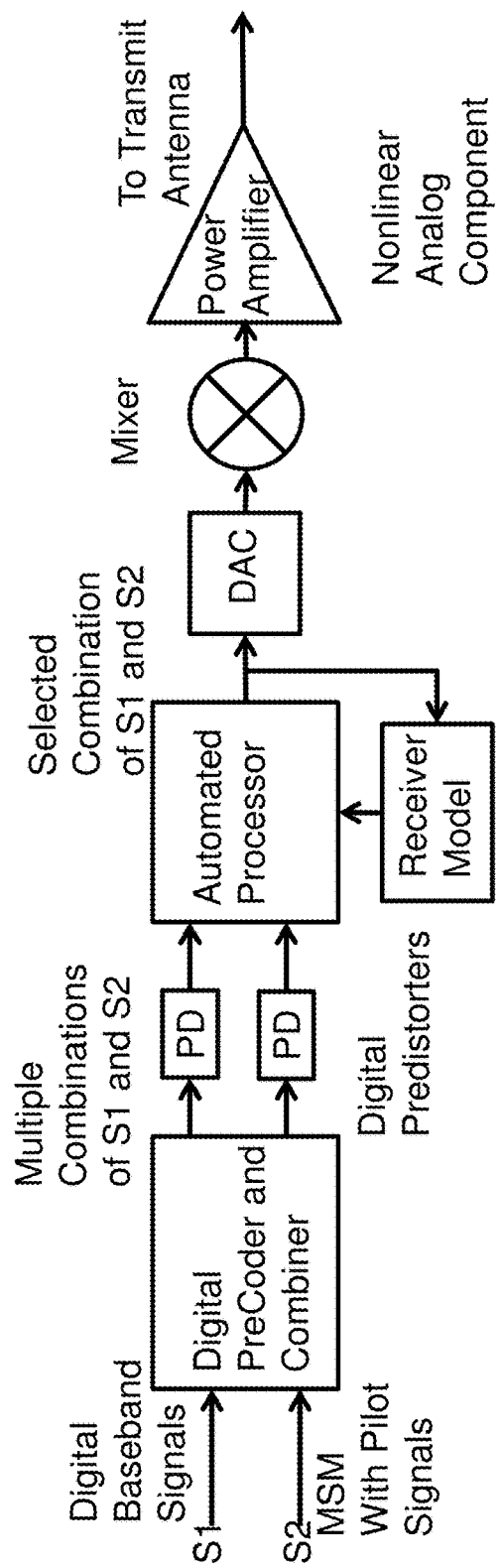
FIG. 15 shows a block diagram of a system according to one embodiment of the invention, including digital predistortion to compensate for a nonlinear analog amplifier.

FIG. 15 represents a block diagram similar to that in FIG. 14, but with the addition of digital predistortion modules that compensate for nonlinearities that may be present in nonlinear analog components such as the Power Amplifier (including inherent non-linearities, signal-dependent delays, saturation and heating effects). The predistortion is preferably carried out on the alternative combinations, so that the selected combination(s) properly meet all criteria.

The predistortion may encompass correction of multiple distortion sources, and represent transformations of the signal in the time (delay) and/or frequency domains, amplitude and waveform adjustments, and may be adaptive, for example, to compensate for aging and environmental conditions. In the case of multiple-input multiple-output (MIMO) radio transmission systems (or other signal transmissions), the distortion model encompasses the entire signal transmission chain. This model may include distinct models for the various multipaths, and therefore the selected alternative predistorted signal may represent an optimum for the aggregate system, and not only the "principal" signal component.

Figure 16:
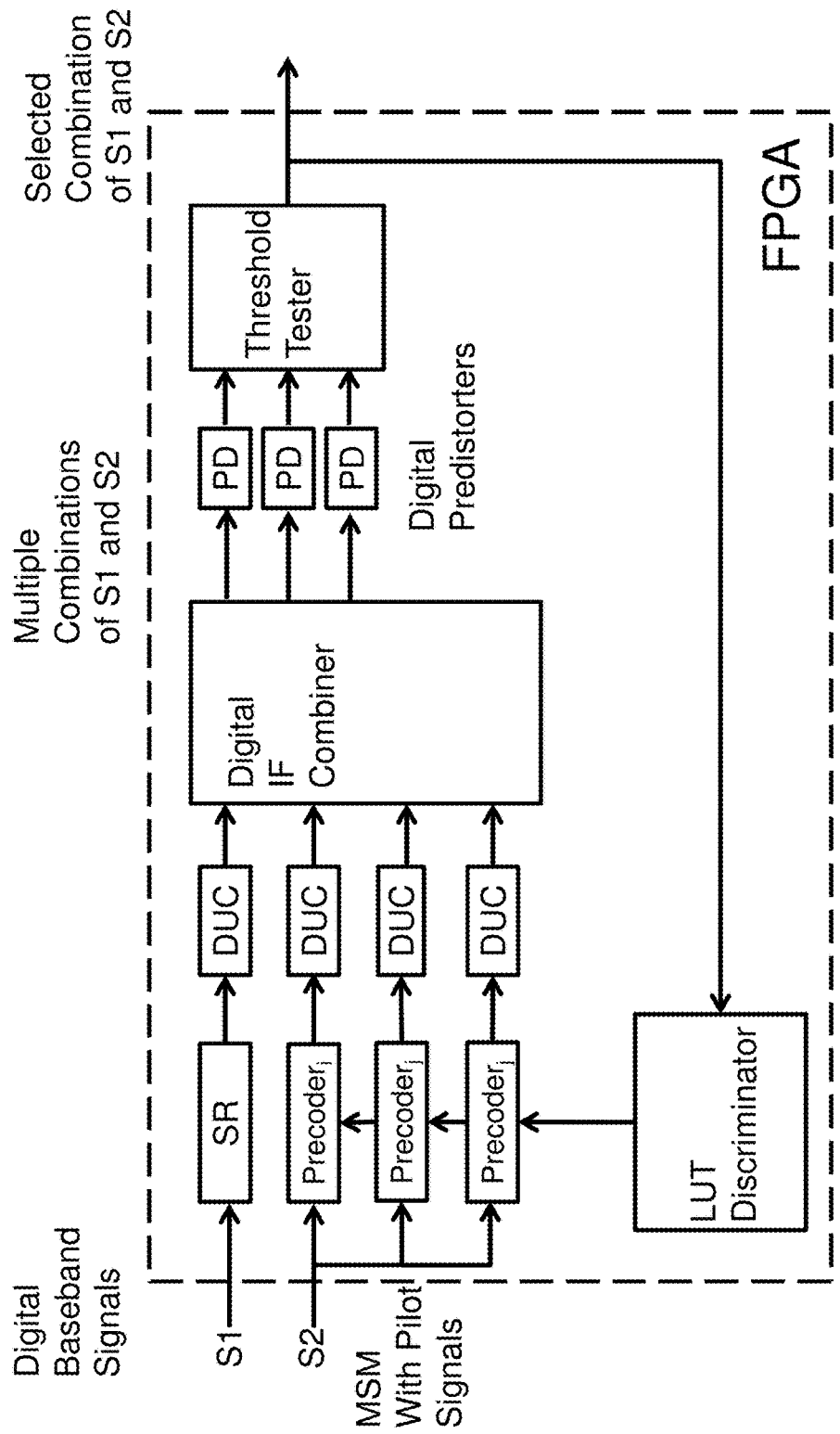
FIG. 16 shows a block diagram of a system according to the invention, implemented on an FPGA.

One preferred implementation of the technique involves using a fast field-programmable gate array (FPGA) with blocks for shift-register memories, lookup tables, digital up-conversion, and threshold testing. This is illustrated in FIG. 16, which also shows the optional addition of digital predistortion. In this embodiment, the input digital baseband signals (in the time domain) are first stored in memory registers within the FPGA, and the MSM signal S2 is transformed in a plurality of digital precoders. In one embodiment, these precoders may comprise circular shift registers (CSRs) with different values of the shift parameter. In other embodiments, the range of parameter variation is not time (i.e., the incremental variation in a CSR), but rather another parameter, such as the time-frequency range of a wavelet transform. These shifted versions are chosen so as to be compatible with pilot signal tracking in the receiver, as determined by the lookup-table discriminator block. This LUT may take into account prior shifts, as shown in FIG. 16. FIG. 16 shows several precoding schemas (e.g., circular shifts) being processed in parallel, although serial processing is also possible. Each baseband signal to be combined is subjected to digital upconversion in the digital upconverter DUC to a proper intermediate frequency (IF), with an increase in sampling rate as appropriate. Sample S1 and each alternative S2 may then be digitally combined in the Digital IF Combiner unit. This is followed by optional digital predistortion in digital predistorters PD, before each alternative combination is sent to the Threshold Tester. The Threshold Tester may, for example, measure the PAPR of each alternative, and choose the alternative with the lowest PAPR.

Alternatively, an ultrafast digital technology, such as rapid-single-flux-quantum (RSFQ) superconducting circuits, may be employed. As the number of OFDM channels being combined is increased, one needs either to increase the algorithm speed, or alternatively carry out a portion of the processing in parallel.

This method may also be applied to a reconfigurable system along the lines of cognitive radio, wherein the channels to be transmitted may be dynamically reassigned depending on user demand and available bandwidth. Both the number of transmitted channels and their frequency allocation may be varied, under full software control. As long as all channels follow the same general symbol protocol and timing, one may apply a similar set of Shift-and-Add algorithms to maintain an acceptable PAPR for efficient transmission.

What is claimed is:

1. A communication method, comprising:
    modulating, for a respective symbol time period, a set of information symbols to occupy a plurality of frequency subchannels of a communication channel, a respective signal in each respective frequency subchannel having a cyclic prefix, at least one subchannel distinct from the plurality of respective frequency subchannels occupied by the set of information symbols being occupied by at least one pilot signal, to form a composite signal within the communication channel;
    applying at least one cyclic shift to the composite signal within the communication channel, to produce at least one cyclically rotated composite signal;
    analyzing each respective cyclically rotated composite signal with respect to a model of a receiver for receiving the modulated set of information symbols, to determine whether the model of the receiver can receive the at least one pilot signal and a predicted bit error rate of a radio frequency communication of the respective cyclically rotated composite signal to a radio receiver corresponding to the model of the receiver; and
    selecting a respective cyclically rotated composite signal based on said analyzing whether the model of the receiver can receive the at least one pilot signal and the predicted bit error rate.

2. The communication method according to claim 1, further comprising:
    further analyzing each respective cyclically rotated composite signal with respect to a peak to average power ratio, and
    selecting a respective cyclically rotated composite signal further based on the peak to average power ratio.

3. The communication method according to claim 1, further comprising analyzing each respective cyclically rotated composite signal to determine whether the model of the receiver can demodulate the modulated set of information symbols.

4. The communication method according to claim 1, wherein the model of the receiver is dependent on a prior communication history.

5. The communication method according to claim 1, further comprising predicting a state of a radio frequency communication channel for transmitting the selected cyclically rotated composite signal as a radio frequency signal, and selecting the respective cyclically rotated composite signal further based on the predicted state of the radio frequency channel.

6. The communication method according to claim 1, wherein said modulating comprises modulating, for a respective symbol time period, the set of information symbols to occupy a plurality of orthogonal frequency subchannels of an orthogonal frequency division multiplexed communication channel operating according to an OFDM signal communication protocol.

7. The communication method according to claim 1, further comprising:
    modulating, for the respective symbol time period, a second set of information symbols to occupy a plurality of frequency subchannels of a second communication channel, a respective signal in each respective frequency subchannel of the second communication channel having a cyclic prefix, at least one subchannel of the second communication channel distinct from the respective plurality of frequency subchannels occupied by the second set of information symbols being occupied by at least one pilot signal, to form a second composite signal within the second communication channel;
    combining the second composite signal within the second communication channel with the composite signal within the communication channel;
    said analyzing comprising analyzing each respective cyclically rotated composite signal combined with the second composite signal with respect to the model of a receiver for receiving the modulated set of information symbols, to determine whether the model of the receiver can receive the at least one pilot signal.

8. The communication method according to claim 7, further comprising:
    analyzing each respective cyclically rotated composite signal combined with the second composite signal with respect to at least one of a peak to average power ratio and a predicted distortion, and
    selecting a respective cyclically rotated composite signal combined with the second composite signal based on said analyzing whether the model of the receiver can receive the at least one pilot signal, and the at least one of a peak to average power ratio and a predicted distortion.

9. The communication method according to claim 1, further comprising:
    modulating a second set of information symbols for define a second signal within a second communication channel non-overlapping with the communication channel;
    combining the second communication channel with the composite signal within the communication channel;
    said analyzing comprising analyzing each respective cyclically rotated composite signal combined with the second communication channel with respect to the model of a receiver for receiving the modulated set of information symbols, to determine whether the model of the receiver can receive the at least one pilot signal.

10. The communication method according to claim 9, further comprising:
    analyzing each respective cyclically rotated composite signal combined with the second composite signal with respect to at least one of a peak to average power ratio and a predicted distortion, and
    selecting a respective cyclically rotated composite signal combined with the second composite signal based on said analyzing whether the model of the receiver can receive the at least one pilot signal, and the at least one of a peak to average power ratio and a predicted distortion.

11. The communication method according to claim 1, wherein the composite signal is compatible with at least one protocol selected from the group of an IEEE 802.11 protocol, an IEEE 802.16 protocol, a 3GPP-LTE downlink protocol, a DAB protocol and a DVB protocol.

12. A communication device, comprising:
at least one modulator, configured to modulate, for a respective symbol time period, a set of information symbols to occupy a plurality of frequency subchannels of a communication channel, a respective signal in each respective frequency subchannel having a cyclic prefix, at least one subchannel distinct from the plurality of respective frequency subchannels occupied by the set of information symbols being occupied by at least one pilot signal, to form a composite signal within the communication channel;
a shifter configured to apply at least one cyclic shift to the composite signal within the communication channel, to produce at least one cyclically rotated composite signal; and
an automated analyzer, configured to analyze each respective cyclically rotated composite signal with respect to a model of a receiver for receiving the modulated set of information symbols, to determine whether the model of the receiver can receive the at least one pilot signal and to predict a bit error rate of a radio frequency communication of the respective cyclically rotated composite signal to a radio receiver corresponding to the model of the receiver, and to select a respective cyclically rotated composite signal based on said analyzing whether the model of the receiver can receive the at least one pilot signal and the predicted bit error rate.

13. The communication device according to claim 12, wherein the automated analyzer is further configured to analyze each respective cyclically rotated composite signal with respect to a peak to average power ratio, and
select a respective cyclically rotated composite signal further based on the peak to average power ratio.

14. The communication device according to claim 12, wherein the automated analyzer is further configured to analyze each respective cyclically rotated composite signal to determine whether the model of the receiver can demodulate the modulated set of information symbols.

15. The communication device according to claim 12, wherein the model of the receiver is dependent on a state of the receiver dependent on a prior communication history.

16. The communication device according to claim 12, wherein the automated analyzer is further configured to predict a state of a radio frequency communication channel for transmitting the selected cyclically rotated composite signal as a radio frequency signal, and to select the respective cyclically rotated composite signal further based on the predicted state of the radio frequency channel.

17. The communication device according to claim 12, wherein said modulator is configured, to modulate, for a respective symbol time period, the set of information symbols to occupy a plurality of orthogonal frequency subchannels of an orthogonal frequency division multiplexed communication channel operating according to an OFDM signal communication protocol,
further comprising a second modulator configured to modulate, for the respective symbol time period, a second set of information symbols to occupy a second plurality of frequency subchannels of a second orthogonal frequency division multiplexed communication channel operating according to the OFDM signal communication protocol, to form a second composite signal within the second communication channel;
a combiner configured to combine the second composite signal within the second communication channel with the composite signal within the communication channel;
the automated analyzer being further configured to analyze each respective cyclically rotated composite signal combined with the second composite signal with respect to the model of a receiver for receiving the modulated set of information symbols, to determine whether the model of the receiver can receive the at least one pilot signal.

18. A communication device, comprising:
an input configured to receive a stream of information defining a sequence of symbols;
at least one modulator, configured to modulate a set of information symbols each with a cyclic prefix and at least one pilot signal, to occupy a plurality of frequency subchannels of a communication channel, to form a composite signal within the communication channel compatible with a communication protocol; and
at least one automated processor, configured to:
apply at least one cyclic transformation to the composite signal within the communication channel, to produce at least one cyclically transformed composite signal; and
analyze each respective cyclically transformed composite signal with respect to a receiver model emulating a receiver compatible with the communication protocol, to determine whether the receiver model can receive the sequence of signals and the at least one pilot signal and to predict a quantitative impairment of a radio frequency communication of the respective cyclically rotated composite signal to a radio receiver corresponding to the model of the receiver, and to select a respective cyclically transformed composite signal based on the analysis and the predicted quantitative impairment.

19. The communication device according to claim 18, wherein the model of the receiver is adapted based on a prior communication history with the radio receiver corresponding to the model of the receiver.

20. The communication device according to claim 18, wherein the plurality of frequency subchannels are a plurality of orthogonal frequency subchannels of an orthogonal frequency division multiplexed communication channel operating according to an OFDM signal communication protocol.

* * * * *